United States Patent [19]
Tezuka et al.

[11] Patent Number: 5,619,482
[45] Date of Patent: Apr. 8, 1997

[54] OPTICAL HEAD UNIT FOR AN OPTICAL DISK USING A DIFFRACTION GRATING

[75] Inventors: Koichi Tezuka; Kyoko Miyabe; Shingo Hamaguchi, all of Kawasaki, Japan

[73] Assignee: Fujitsu Limited, Japan

[21] Appl. No.: 529,270

[22] Filed: Sep. 15, 1995

[30] Foreign Application Priority Data

| Oct. 5, 1994 | [JP] | Japan | 6-241447 |
| Jul. 10, 1995 | [JP] | Japan | 7-173806 |

[51] Int. Cl.⁶ ..................................... G11B 7/09
[52] U.S. Cl. ................. 369/44.23; 369/44.14; 369/103; 369/44.41
[58] Field of Search .................. 369/103, 44.12, 369/112, 44.14, 44.23, 109, 44.41, 44.42

[56] References Cited

U.S. PATENT DOCUMENTS

| 5,243,583 | 7/1993 | Ohuchida et al. | 369/44.12 |
| 5,406,543 | 4/1995 | Kobayashi et al. | 369/109 X |
| 5,436,876 | 7/1995 | Yokoyama et al. | 369/44.12 |
| 5,475,670 | 12/1995 | Hamada et al. | 369/44.23 |

FOREIGN PATENT DOCUMENTS

| 255173 | 2/1988 | European Pat. Off. |  |
| 288033 | 10/1988 | European Pat. Off. |  |
| 0627733 | 12/1994 | European Pat. Off. | 369/103 |
| 0253841 | 10/1989 | Japan | 369/103 |
| 0029942 | 1/1990 | Japan | 369/103 |

*Primary Examiner*—Thang V. Tran
*Attorney, Agent, or Firm*—Greer, Burns & Crain, Ltd.

[57] ABSTRACT

An optical information recording-and-reproducing unit includes a diffraction section provided with a reflected optical beam reflected on a storage medium. The diffraction section has at least first and second areas, and from each of the first and second areas, a +1-order diffraction light and a −1-order diffraction light are produced. The unit further includes first and second optical detection sections respectively provided with one of a pair of +1-order diffraction lights and a pair of −1-order diffraction lights produced from the first and second areas of the diffraction section. The unit still further includes a first circuit section for generating a tracking error signal based on output signals of the first and second optical detection sections. In the unit, the light provided to the first optical detection section forms a first spot in a far-field state before convergence, and the light provided to the second optical detection section forms a second spot in a far-field state after convergence.

17 Claims, 34 Drawing Sheets

FIG. 3A
PRIOR ART
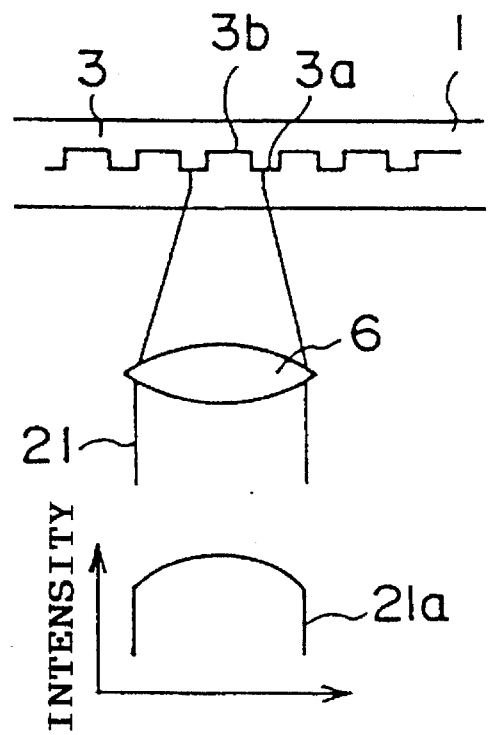
FIG. 3B
PRIOR ART
FIG. 3C
PRIOR ART
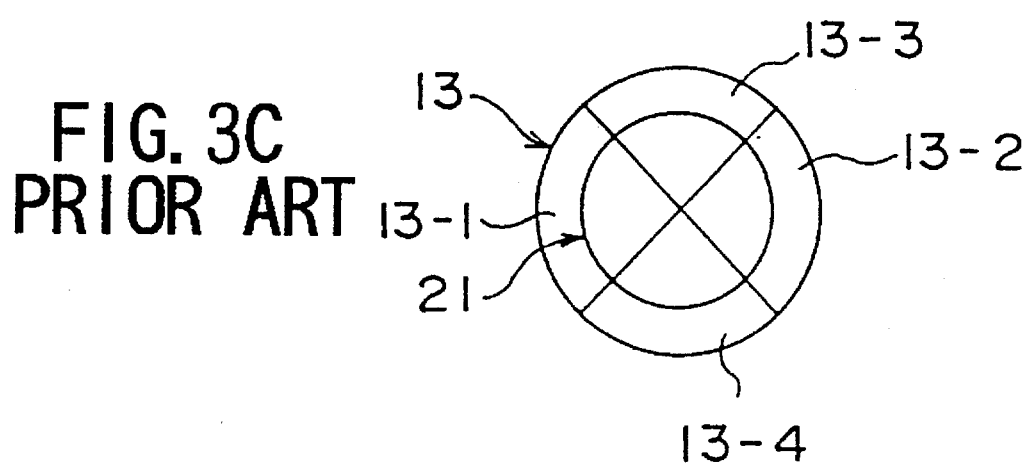

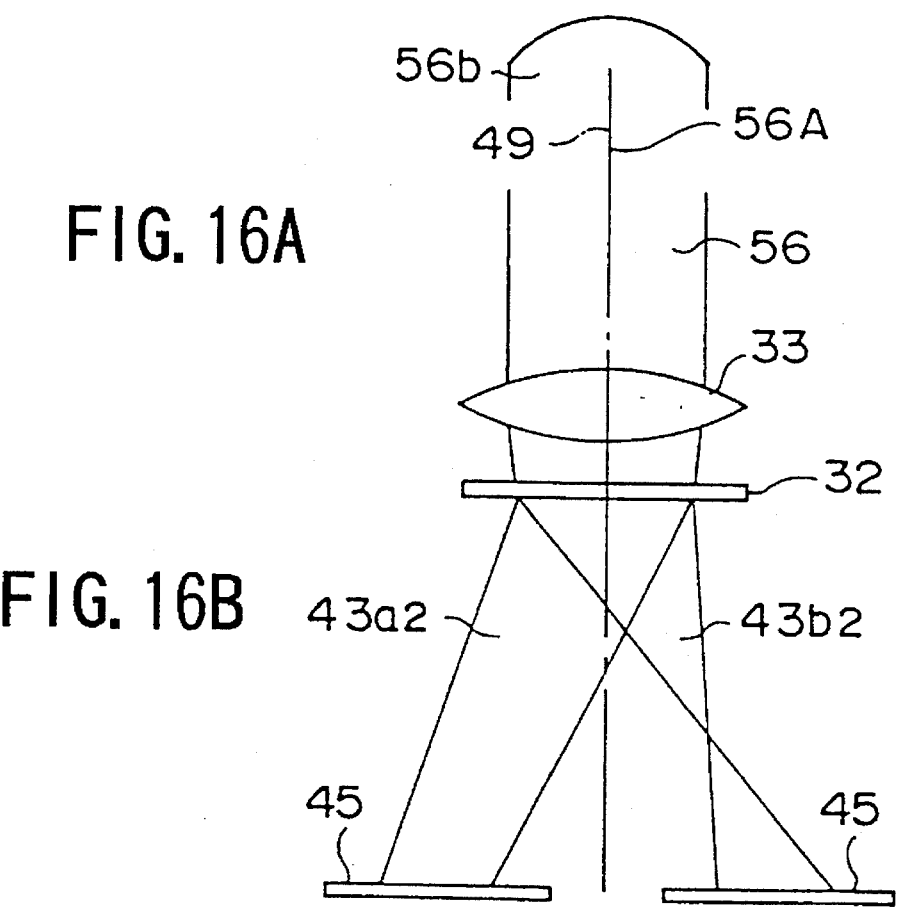
FIG. 16A
FIG. 16B
FIG. 16C
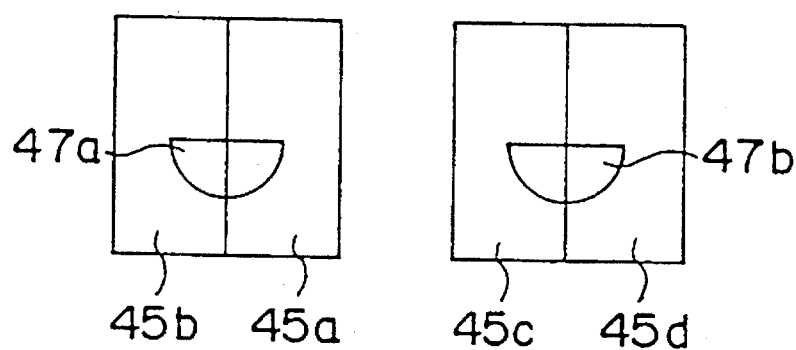
FIG. 16D

FIG. 17A
FIG. 17B
FIG. 17C
FIG. 17D
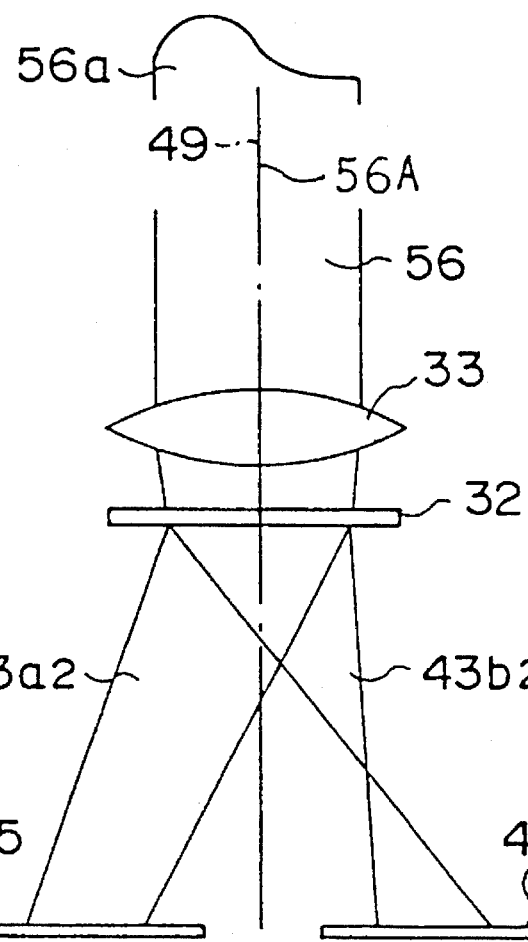
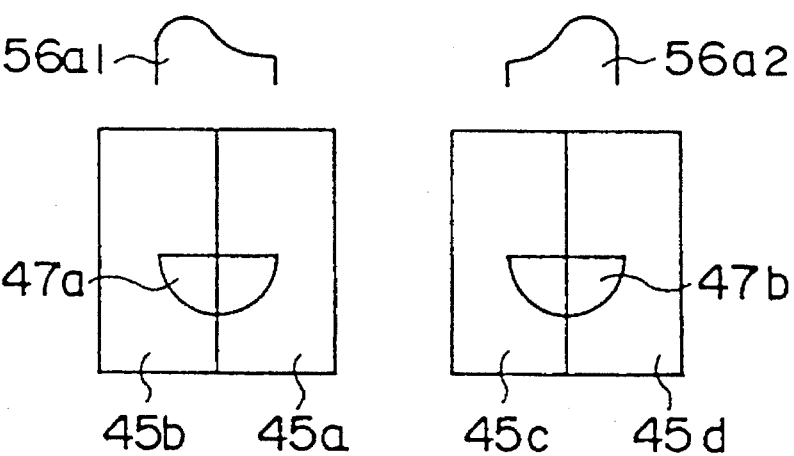

OPTICAL HEAD UNIT FOR AN OPTICAL DISK USING A DIFFRACTION GRATING

BACKGROUND OF THE INVENTION

1. Field of the Invention

The present invention generally relates to an optical information recording-and-reproducing unit, and more particularly, to an optical information recording-and-reproducing unit which optically records information to a storage medium, and/or optically reproduces information from the storage medium.

In the specification, the meaning of "recording information" includes "erasing information".

An example of an apparatus including the optical information recording-and-reproducing unit is an optical disk unit. The optical disk unit is usable as a storage unit of a computer system and a file system, etc., since the optical disk unit is suitable for storing programs and a large amount of data. In such an optical disk unit used as the storage unit, as computer systems, etc., are miniaturized, it is desired that the optical system in the optical disk accurately record and reproduce information to improve reliability and to reduce the number of components as much as possible to reduce the overall cost of the optical disk unit.

2. Description of the Related Art

FIG. 1 shows a configuration of a first conventional optical system. The optical system is disclosed in Japanese Laid-Open Patent Application No.1-106341 (FIG. 1). In FIG. 1, in a information side 2 of a storage medium 1, a track 3 including a information area 3a and a middle area 3b is formed. The storage medium 1 rotates about an axis 8 in parallel to an optical axis 00' (discussed later) of the optical system. The information side 2 is scanned by an optical beam b from a laser diode 4. The optical beam b is focused on the information side 2 through a diffraction grating 9 and an object lens system 6 to form a spot V. The optical beam b reflected on the information side 2 is provided to the diffraction grating 9 through the object lens system 6. The optical beam b diffracted in the diffraction grating 9 is provided to an optical detection system 10. In this case, the diffracted optical beam b, from the diffraction grating 9, to the optical detection system 10 is, for example, one of a +1-order diffraction light and a −1-order diffraction light. Based on the +1-order diffraction light or the −1-order diffraction light which are detected in the optical detection system 10, a focus error signal is generated.

FIG. 2 shows a configuration of a second conventional optical system. The second conventional optical system is disclosed in Optical Data Storage Topical Meeting 1992, Technical Digest 32/MC2-MC2/35 (FIG. 3). In FIG. 2, an optical beam from a laser diode 11 is focused on a storage medium (not shown) through a mirror 12, a hologram element 13 and an object lens system (not shown). The optical beam reflected on the storage medium is provided to the hologram element 13 through the object lens system, and is diffracted in the hologram element 13. The diffracted optical beam from the hologram element 13 is provided to an optical detection system 14 including optical detectors 14a to 14d. In this case, the diffracted beam from the hologram element 13 to the optical detection system 14 is both +1-order diffraction light and −1-order diffraction light. Based on the +1-order diffraction light and the −1-order diffraction light which are detected in the optical detection system 14, the focus error signal is generated.

In the first conventional optical system, the optical beam b reflected on the information side 2 is diffracted in the diffraction grating 9 through the object lens system 6, and is provided to the optical detection system 10. The diffracted optical beam from the diffraction grating 9 to the optical detection system 10 is one of the +1-order diffraction light and the −1-order diffraction light. Therefore, for generating the focus error signal, only one of the +1-order diffraction light and the −1-order diffraction light is used. Accordingly, the amount of light used for generating the focus error signal is relatively small. As a result, a current level produced by optical-to-electrical conversion in the optical detection system 10 becomes small, and, thus, there is a problem that the quality of the detected signal is degraded.

Therefore, to improve availability of the +1-order diffraction light, the diffraction grating 9 having a cross-section in the shape of a saw blade may be used. In this case, intensity of the +1-order diffraction light is larger than that of the −1-order diffraction light, and, thus, the availability of the reflected optical beam b may be improved. However, it is difficult to manufacture such a diffraction grating 9 having the saw-blade-shaped cross section, and cost of the diffraction grating is increased.

On the other hand, in the second conventional optical system, for generating the focus error signal, both the +1-order diffraction light and the −1-order diffraction light are used. Therefore, as for the availability of the optical beam b reflected on the storage medium, there is no problem as in the first conventional optical system. However, as described later, there is a problem that an offset is caused in a tracking error signal by a beam shift. In general, the tracking error signal is determined by a relationship between positions of the optical beam spot and the track to be scanned by the optical beam spot. A tracking servo operation is carried out based on the tracking error signal. However, when the beam shift occurs, the beam spot is shifted from an optical axis which is a central axis for detecting intensity distribution of the beam spot. Therefore, when the beam shift occurs, even if the track servo regularly operates, the track may not be regularly scanned by the beam spot.

First, a description will be given of a conventional tracking operation of the second conventional optical system when no beam shift occurs, by referring to FIGS. 3A, 3B, 3C to FIGS. 5A. 5B. 5C.

FIG. 3A to FIG. 3C show illustrations for explaining a generating process of the tracking error signal in the second conventional optical system when the beam spot is on the track. FIG. 4A to FIG. 4C show illustrations for explaining the generating process of the tracking error signal in the second conventional optical system when the beam spot is shifted from the track to the right side. FIG. 5A to FIG. 5C show illustrations for explaining a generating process of the tracking error signal in the second conventional optical system when the beam spot is shifted from the track to the left side.

As shown in FIG. 3A, the optical beam is focused on a storage medium 1 to form a small beam spot, for example, a less than 1-μm diameter spot. When the beam spot is diffracted by a track 3 on the storage medium 1, an intensity distribution 21a of a reflected optical beam 21 from the storage medium 1, shown in FIG. 3B, is varied in a vertical plane of an optical axis according to a variation of a location relationship between the beam spot and the track 3. The reflected optical beam 21 is diffracted in the hologram element 13 and is provided to the optical detection system 14 shown in FIG. 2. In FIG. 3C, a relationship the reflected optical beam 21 provided to the hologram element 13 and areas 13-1 to 13-4 of the hologram element 13 are represented.

In the reflected optical beam provided from the area 13-1 of the hologram element 13, the +1-order diffraction light is provided to the optical detector 14a, and the −1-order diffraction light is provided to the optical detector 14c. In the reflected optical beam provided from the area 13-2 of the hologram element 13, the +1-order diffraction light is provided to the optical detector 14b, and the −1-order diffraction light is provided to the optical detector 14d. In the reflected optical beams provided from the areas 13-3, 13-4 of the hologram element 13, the +1-order and −1-order diffraction lights are provided to other optical detector except the optical detectors 14a to 14d, these operational descriptions are eliminated, here.

In those conditions shown in FIG. 3A to FIG. 3C, when output signals of the optical detectors 14a to 14d are referred to as A to D, the tracking error signal TES is represented by the following equation (1).

$$TES=(A+C)-(B+D) \qquad (1)$$

When the beam spot on the storage medium 1 is shifted from the track 3 to the right side of FIG. 3A as shown in FIG. 4A, the intensity distribution 21a of the reflected optical beam 21 from the storage medium 1 is changed as shown in FIG. 4B, and the intensity on the left side of the intensity distribution is increased. Namely, in FIG. 4C, an amount of light provided to the area 13-1 of the hologram element 13 becomes larger than that provided to the area 13-2 thereof. Therefore, an amount of light provided to the optical detectors 14a, 14c becomes larger than that provided to the optical detectors 14b, 14d. As a result, in the condition shown in FIG. 4A, from the equation (1), a relationship TES>0 is established.

On the other hand, When the beam spot on the storage medium 1 is shifted from the track 3 to the left side of FIG. 3A as shown in FIG. 5A, the intensity distribution 21a of the reflected optical beam 21 from the storage medium 1 is changed as shown in FIG. 5B, and the intensity in the right side of the intensity distribution is increased. Namely, in FIG. 5C, an amount of light provided to the area 13-2 of the hologram element 13 becomes larger than that provided to the area 13-1 thereof. Therefore, an amount of light provided to the optical detectors 14b, 14d becomes larger than that provided to the optical detectors 14a, 14c. As a result, in the condition shown in FIG. 5A, from the equation (1), a relationship TES<0 is established.

By the above operation, it is understood that the tracking servo may be carried out by using the tracking error signal TES generated based on the equation (1).

Next, a description will be discussed of the tracking operation when the beam shift occurs, by referring to FIGS. 6A, 6B to FIGS. 8A, 8B. In general, the beam shift is caused by position change of optical components, fluctuation of the plane of the storage medium 1 during rotation, etc. When the beam shift occurs, the central axis of the beam spot is shifted from the optical axis which is the central axis for detecting the intensity distribution of the beam spot.

FIG. 6A and FIG. 6B show illustrations for explaining the generating process of the tracking error signal in the second conventional optical system when no beam shift occurs. FIG. 7A and FIG. 7B show illustrations for explaining the generating process of the tracking error signal in the second conventional optical system when the beam is shifted from the optical axis to the right side by the beam shift. FIG. 8A and FIG. 8B show illustrations for explaining the generating process of the tracking error signal in the second conventional optical system when the beam is shifted from the optical axis to the left side by the beam shift. FIGS. 6A, 7A, 8A respectively show the reflected optical beam 21 provided to the hologram element 13 through the object lens 6, and FIGS. 6B, 7B, 8B respectively show a relationship between the areas 13-1 to 13-4 of the hologram element 13 and the reflected optical beam 21 provided to the hologram element 13.

In FIG. 6A, a central axis 22 of the reflected optical beam 21 is identical to an optical axis 23.

When the beam shift is caused by a position change of the optical components such as an object lens 6, and fluctuation of the plane of the storage medium 1 during rotation, etc., even if the beam spot is regularly formed on the track of the storage medium 1, the central axis 22 of the reflected optical beam 21 may be shifted from the optical axis 23. For example, as shown in FIG. 7A, the central axis 22a is shifted to the right side from the optical axis by a distance d. In this case, a position of the reflected beam 21 on the hologram element 13 is also shifted to the right side as shown in FIG. 7B. Therefore, the amount of light provided to the area 13-2 of the hologram element 13 becomes larger than that provided to the area 13-1 thereof; and, thus, the amount of light provided to the optical detectors 14b, 14d becomes larger than that provided to the detectors 14a, 14c. As a result, the tracking error signal TES is represented as TES=(A+C)−(B+D)<0 by using the equation (1).

In the same way, when the beam shift is caused, even if the beam spot is regularly formed on the track of the storage medium 1, the central axis 22a of the reflected optical beam 21 may be shifted to the left side from the optical axis 23 by the distance d as shown in FIG. 8A. In this case, the position of the reflected beam 21 on the hologram element 13 is also shifted to the left side as shown in FIG. 8B. Therefore, the amount of light provided to the area 13-1 of the hologram element 13 becomes larger than that provided to the area 13-2 thereof, and, thus, the amount of light provided to the optical detectors 14a, 14c becomes larger than that provided to the detectors 14b, 14d. As a result, the tracking error signal TES is represented as TES=(A+C)−(B+D)>0 by using the equation (1).

In this way, when the beam shift is caused, even if the beam spot is regularly formed on the track of the storage medium 1, the tracking error signal TES may not be 0, and may have an offset. When the tracking servo is carried out by using such a tracking error signal TES having the offset, the beam spot may not regularly scan the track on the storage medium 1, so that it may cause a reproduction error.

SUMMARY OF THE INVENTION

It is an object of this invention to provide an optical information recording-and-reproducing unit. In the unit, an amount of light of a reflected optical beam which is reflected on a storage medium and is provided to an optical detection system is efficiently used, and prevents the quality of a detected signal from being degraded. Also, in the unit, even if a beam shift is caused, a tracking servo operation may be regularly performed so as to prevent reproduction error. This permits the disadvantages described above to be eliminated.

The object described above is achieved by an optical information recording-and-reproducing unit comprising: a diffraction section provided with a reflected optical beam which is reflected on a storage medium, the diffraction section having at least first and second areas, from each of the first and second areas, a +1-order diffraction light and a −1-order diffraction light are produced; first and second optical detection sections respectively provided with one of a pair of +1-order diffraction lights and a pair of −1-order diffraction lights produced from the first and second areas of the diffraction section; and a first circuit section for generating a tracking error signal based on output signals of the first and second optical detection sections; wherein the light provided to the first optical detection section forms a first spot in a far-field state before convergence, and the light provided to the second optical detection section forms a second spot in a far-field state after convergence.

According to the above unit, even if the beam shift is caused by position change of optical components, fluctuation of the plane of a storage medium during rotation of a magneto-optical disk, etc., a regular tracking error signal having no offset may be generated. Therefore, a highly accurate tracking servo may always be performed.

The object described above is also achieved by the unit mentioned above, wherein the unit further comprises: third and fourth optical detection sections for being respectively provided with the other one of the pair of +1-order diffraction lights and the pair of −1-order diffraction lights produced from the first and second areas of the diffraction section; and a second circuit section for generating a focus error signal based on output signals of the third and fourth optical detection sections.

According to the above unit, one of a pair of +1-order diffraction lights and a pair of −1-order diffraction lights produced from the diffraction section is used for generating the tracking error signal, and the other pair is used for generating the focus error signal. Therefore, usability of the optical beam may be improved. Since both the +1-order diffraction light and the −1-order diffraction light are used, it is not necessary to use a specific hologram for the diffraction section. Thus, cost of the unit may be reduced.

The object described above is also achieved by the unit mentioned above, wherein the unit further comprises a single base in which the first, second, third and fourth optical detection sections are installed.

According to the above unit, the first through fourth optical detection sections are installed on the single base. Therefore, configuration of the unit becomes simple, and the number of components may be reduced.

The object described above is also achieved by the unit mentioned above, wherein the first and second circuit sections are installed on the base.

According to the above unit, since the first and second circuit sections are installed on the base, the configuration of the unit becomes simple, and the number of components may be reduced.

The object described above is also achieved by the unit mentioned above, wherein the unit further comprises: a light source for providing an optical beam which is focused on the storage medium; wherein the first optical detection section and the third optical detection section are symmetrically arranged on the base about an optical axis of an optical path of the optical beam from the light source to the storage medium, and the second optical detection section and the fourth optical detection section are symmetrically arranged on the base about the optical axis.

According to the above unit, the first and third optical detection sections are symmetrically arranged on the base about the optical axis, and the second and fourth optical detection sections are symmetrically arranged on the base about the optical axis. Therefore, both the +1-order diffraction light and the −1-order diffraction light may be used, and, thus, usability of the optical beam may be improved.

The object described above is also achieved by the unit mentioned above, wherein the first, second, third and fourth optical detection sections are directly formed on the base.

According to the above unit, since the first through fourth optical detection sections are directly formed on the base, a relative relationship between positions of the first through fourth optical detection sections and the light source may be easily set. Therefore, the number of components may be reduced.

The object described above is also achieved by the unit mentioned above, wherein the light source is installed on the base.

According to the above unit, since the light source is installed on the base, the relative relationship between positions of the first through fourth optical detection sections and the light source may be easily set and adjusted.

The object described above is also achieved by the unit mentioned above, wherein the unit further comprises a supporting element supporting the light source on the base and radiating heat generated in the light source.

According to the above unit, the heat generated in the light source may be efficiently radiated through the supporting element.

The object described above is also achieved by the unit mentioned above, wherein the unit further comprises a housing, installed on the base, for housing the first, second, third and fourth optical detection sections, the first and second circuit sections, and the light source, the diffraction section being fixed to the housing.

According to the above unit, the housing is installed on the base and houses the first through fourth optical detection sections, the first and second circuit sections, and the light source. The housing may be utilized as an optical device in which a relative relationship between the positions of the above sections has been already adjusted. The unit is suitable for a magneto-optical disk unit.

The object described above is also achieved by the unit mentioned above, wherein the unit further comprises a supporting element for supporting the light source for the housing and radiating heat generated in the light source.

According to the above unit, the heat generated in the light source may be efficiently radiated through the supporting element and the housing.

The object described above is also achieved by the unit mentioned above, wherein the diffraction section comprises: a hologram element having a plurality of areas including first and second areas, the plurality of areas are formed by being divided by one or more dividing lines approximately parallel to a direction in which intensity distribution of the reflected beam changes with track on the storage medium; wherein when the reflected beam is provided to the hologram element, each of the areas produces a +1-order diffraction light and a −1-order diffraction light to corresponding to ones of the first, second, third and fourth optical detection sections.

According to the above unit, a simple and less expensive hologram element may be used as the diffraction section.

The object described above is also achieved by the unit mentioned above, wherein the third and fourth optical detection sections are respectively provided with the other one of the pair of +1-order diffraction lights and the pair of −1-order diffraction lights produced from the first and second areas of the diffraction section, at a position close to a focused point.

According to the above unit, since the Foucault method is used for detecting a focus error, a stable focus servo may be carried out. Therefore, the possibility of a reproduction error may be reduced.

The object described above is also achieved by an optical information recording-and-reproducing unit comprising: a diffraction section provided with a reflected optical beam which is reflected on a storage medium, the diffraction section having a plurality of areas which produce +1-order diffraction lights and −1-order diffraction lights; first and second optical detection sections being respectively provided with two 1-order diffraction lights of the +1-order diffraction lights and the −1-order diffraction lights produced from the areas of the diffraction section in a far-field state; a first circuit section for generating a tracking error signal based on output signals of the first and second optical detection sections; third and fourth optical detection sections being respectively provided with the other two 1-order diffraction lights of the +1-order diffraction lights and the −1-order diffraction lights produced from the areas of the diffraction section at a position close to a focused point; and a second circuit section for generating a focus error signal based on output signals of the third and fourth optical detection sections.

According to the above unit, even if the beam shift is caused by a position change of optical components, and fluctuation of the plane of the storage medium during rotation of the magneto-optical disk, etc., the regular tracking error signal having no offset may be generated. Therefore, the highly accurate tracking servo may always be carried out. One of a pair of +1-order diffraction lights and a pair of −1-order diffraction lights produced from the diffraction section is used for generating the tracking error signal, and the other pair is used for generating the focus error signal. Therefore, usability of the optical beam may be improved. Further, since both the +1-order diffraction light and the −1-order diffraction light are used, it is not necessary to use the specific hologram for the diffraction section. Thus, cost of the unit may be reduced. Furthermore, since the Foucault method is used for detecting the focus error, the stable focus servo may be carried out. Therefore, the possibility of a reproduction error is reduced.

The object described above is also achieved by the unit mentioned above, wherein the first circuit section comprises: a first signal generation circuit generating the tracking error signal by using a push-pull method based on the output signals of the first and second optical detection sections; and a second signal generation circuit generating the tracking error signal by using a heterodyne method based on the output signals of the first, second, third and fourth optical detection sections.

According to the above unit, based on the outputs of the first signal generation circuit and the second signal generation circuit, the tracking error signal is obtained by using the push-pull method or the heterodyne method. Therefore, for both, for example, a magneto-optical disk using the push-pull method and a compact disk using the heterodyne method, recording and reproducing operations may be performed with only this unit.

The object described above is also achieved by the unit mentioned above, wherein the first circuit section further comprises a switching circuit which selects one of output signals of the first signal generation circuit and the second signal generation circuit according to a switching signal and produces a selected output signal as the tracking error signal produced from the first circuit section.

According to the above unit, which of the output signals of the first signal generation circuit and the second signal generation circuit is produced as the tracking error signal may be automatically determined by the switching signal.

The object described above is also achieved by the unit mentioned above, wherein the second circuit section comprises a section for generating the focus error signal by using a Foucault method.

According to the above unit, based on the outputs of the first signal generation circuit and the second signal generation circuit, the tracking error signal is obtained by using the push-pull method or the heterodyne method. Therefore, for both, for example, the magneto-optical disk using the push-pull method and the compact disk using the heterodyne method, recording and reproducing operations may be performed with only this unit. Since the level of the obtained focus error signal is relatively high, the focus error signal may not be easily influenced by outside sources. Therefore, the focus servo may be performed with high accuracy.

The object described above is also achieved by the unit mentioned above, wherein the first circuit section further comprises a switching circuit which selects one of output signals of the first signal generation circuit and the second signal generation circuit according to a switching signal and produces a selected output signal as the tracking error signal produced from the first circuit section.

According to the above unit, which of the output signals of the first signal generation circuit and the second signal generation circuit is produced as the tracking error signal may be automatically determined by the switching signal.

The object described above is also achieved by the unit mentioned above, wherein the unit further comprises a single base in which the first, second, third and fourth optical detection sections, and the first and second circuit sections are installed.

According to the above unit, the configuration becomes simple, and the number of components may be reduced.

The object described above is also achieved by the unit mentioned above, wherein the first, second, third and fourth optical detection sections, and the first and second circuit sections are directly formed on the base.

According to the above unit, the relative position relationship between the components may be set easily and accurately, and the number of components may be further reduced.

The object described above is also achieved by the unit mentioned above, wherein the unit further comprises a housing, installed on the base, for housing the first, second, third and fourth optical detection sections and the first and second circuit sections, the diffraction section being fixed to the housing.

The object described above is also achieved by the unit mentioned above, wherein the unit further comprises a light source, installed on the base in the housing, for providing an optical beam which is focused on the storage medium.

According to the above unit, the housing may be utilized as an optical device in which a relative relationship between the positions of the components has already been adjusted. The unit is suitable for an optical disk unit.

According to the present invention, since the amount of light of the reflected signal which is reflected on the storage medium and is provided to the optical detection system is efficiently used, it prevents the quality of the detected signal from being degraded. Further, even if the beam shift occurs, the regular tracking servo may be maintained, and the possibility of a reproduction error may be reduced.

Other objects and further features of the present invention will be apparent from the following detailed description when read in conjunction with the accompanying drawings.

BRIEF DESCRIPTION OF THE DRAWINGS

FIG. 3A to FIG. 3C show illustrations for explaining a generating process of the tracking error signal in the second conventional optical system when a beam spot is on a track;

FIG. 16A to FIG. 16D show illustrations for explaining a generating process of the tracking error signal in the first embodiment of the optical information recording-and-reproducing when the beam spot is on the track;

FIG. 17A to FIG. 17D show illustrations for explaining the generating process of the tracking error signal in the first embodiment of the optical information recording-and-reproducing unit when the beam spot is shifted from the track to the right side;

DESCRIPTION OF THE PREFERRED EMBODIMENTS

Figure 9:
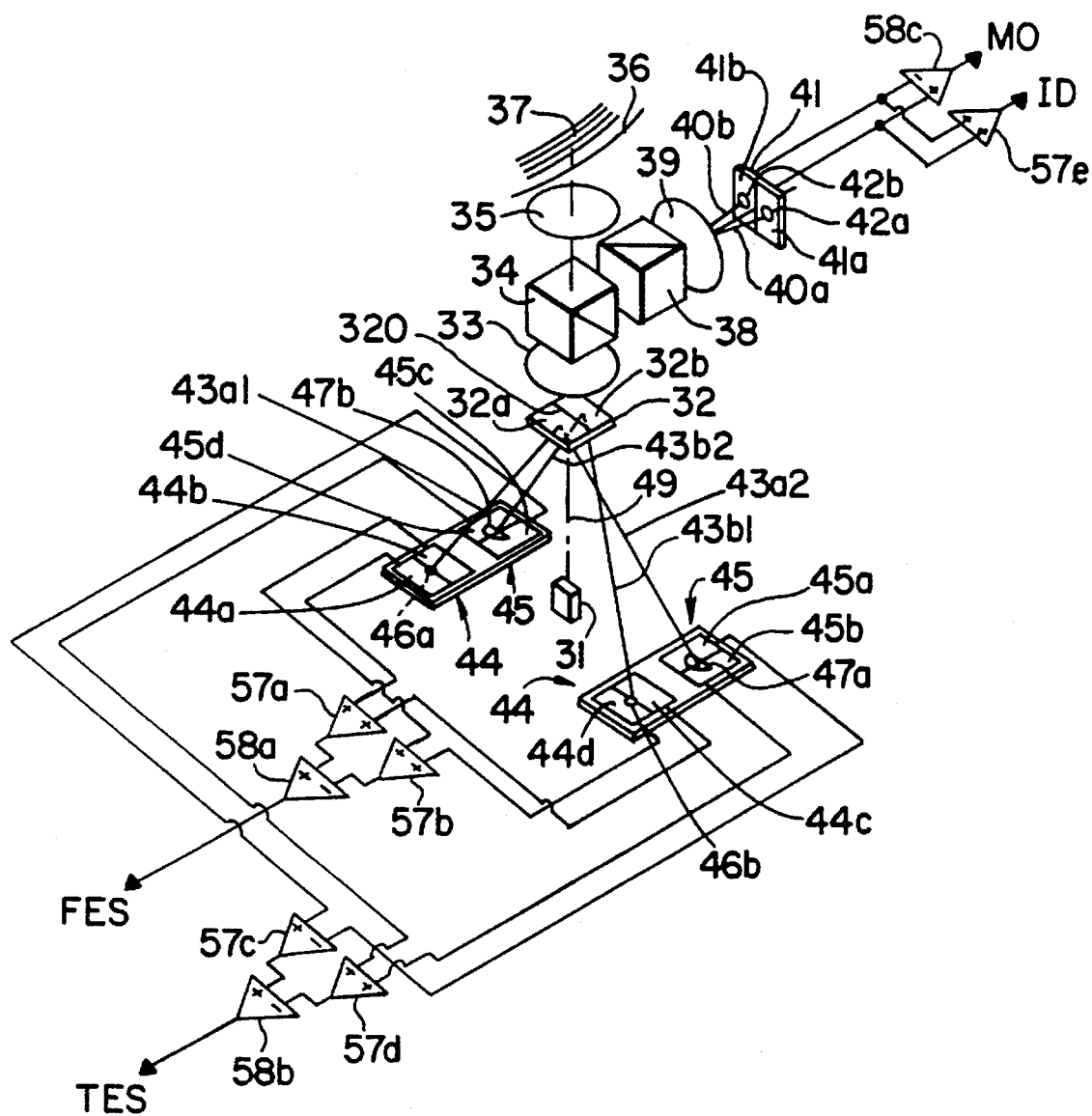
FIG. 9 shows a perspective view of a first embodiment of the optical information recording-and-reproducing unit according to the present invention.

First, a description will be given of a first embodiment of an optical information recording-and-reproducing unit according to the present invention, by referring to FIG. 9. FIG. 9 shows a perspective view of the first embodiment of the optical information recording-and-reproducing unit according to the present invention. In the embodiment, the present embodiment is applied to a magneto-optical disk unit.

In FIG. 9, an optical beam provided from a semiconductor laser 31 scans a track 37 on a magneto-optical disk 36 through a hologram element 32, a collimator lens 33, a beam splitter 34, and an object lens 35. In the hologram element 32, the optical beam is diffracted by areas 32a, 32b of the hologram element 32, and is separated into a 0-order light, ±1-order diffraction lights, and more than ±1-order diffraction lights. The 0-order light transmits along an optical axis 49, and is converted to a parallel light by the collimator lens 33. The parallel light passes through the beam splitter 34 and is provided to the object lens 35. However, the ±1-order diffraction lights, and the more than ±1-order diffraction lights except the 0-order light does not arrive at the object lens 35. Therefore, only the 0-order light is focused on the magneto-optical disk 36 by the object lens 35. By the small beam spot of the 0-order light formed on the magneto-optical disk 36, recording, erasing, and reproducing information for the track 37 of the magneto-optical disk 36 is carried out.

One part of the reflected optical beam which is reflected on the magneto-optical disk 36 is provided to a Wollaston polarizing prism 38 through the object lens 35 and the beam splitter 34, and the other is provided to the hologram element 32 through the collimator lens 33. The Wollaston polarizing prism 38 divides the reflected optical beam into two optical beams, and provides the two optical beams to a divide-by-2 optical detector 41 through a condenser 39. Namely, an optical detector 41a of the divide-by-2 optical detector 41 detects a spot 42a of a P polarizing beam 40a, and an optical detector 41b of the divide-by-2 optical detector 41 detects a spot 42b of an S polarizing beam 40b. Output signals of the optical detectors 41a, 41b are provided to an adder circuit 57e and a differential circuit 58c. The adder circuit 57e adds the output signals of the optical detectors 41a, 41b to each other to produce a reproduction discrimination signal ID. While, the differential circuit 58c subtracts the output signal of the optical detector 41b from the output signal of the optical detector 41a to produce a reproduction magneto-optical signal MO.

In the reflected optical beam reflected on the magneto-optical disk 36, the optical beam, which is provided to the collimator lens 33 through the object lens 35 and the beam splitter 34, is converged by the collimator lens 33 and is provided to the hologram element 32. The hologram element 32 is separated into two areas 32a, 32b by a dividing line 320 in parallel to a direction in which the intensity distribution of the reflected optical beam is changed by the track on the magneto-optical disk 36.

In the reflected optical beam which is reflected on the magneto-optical disk and is provided to the hologram element 32, a +1-order diffraction light 43a1 provided from the area 32a of the hologram element 32 is converged to a spot 46a on divide-by-2 optical detectors 44a, 44b of a composite optical detector 44 by refracting operations provided in the collimator lens 33 and the hologram element 32. While, the reflected optical beam which is reflected on the magneto-optical disk and is provided to the hologram element 32, a +1-order diffraction light 43b1 provided from the area 32b of the hologram element 32 is converged to a spot 46b on divide-by-2 optical detectors 44c, 44d of the composite optical detector 44 by refracting operations provided in the collimator lens 33 and the hologram element 32.

Figure 10:
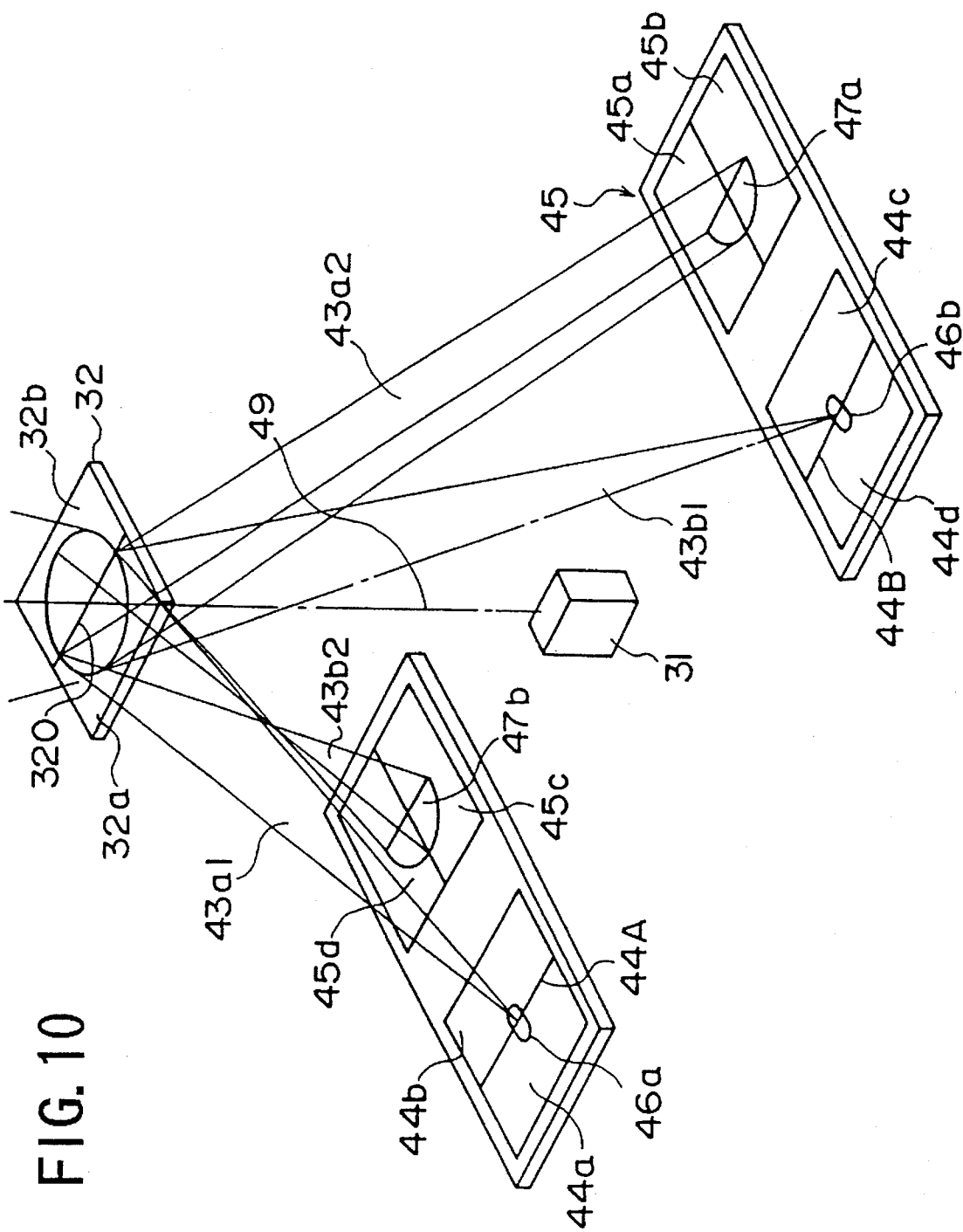
FIG. 10 shows an illustration for explaining convergence of +1-order diffraction lights from a reflected optical beam provided to a hologram element.

FIG. 10 shows an illustration for explaining the convergence of the +1-order diffraction lights 43a1, 43b1. In FIG. 10, an expanded illustration of a part of the drawing of FIG. 9 is shown. Elements in FIG. 10 which are the same as those of FIG. 9 are given the same reference numerals. In FIG. 10, numeral "44A" indicates a dividing line of the divide-by-2 optical detectors 44a, 44b, and numeral "44B" indicates a dividing line of the divide-by-2 optical detectors 44c, 44d.

On the other hand, in the reflected optical beam which is reflected on the magneto-optical disk and is provided to the hologram element 32, a −1-order diffraction light 43a2 provided from the area 32a of the hologram element 32 is provided as a spot 47a in a far-field state before convergence onto the divide-by-2 optical detectors 45a, 45b of a composite optical detector 45 by refracting operations provided in the collimator lens 33 and the hologram element 32. In the reflected optical beam which is reflected on the magneto-optical disk and is provided to the hologram element 32, a −1-order diffraction light 43b2 provided from the area 32b of the hologram element 32 is provided as a spot 47b in a far-field state after convergence onto the divide-by-2 optical detectors 45c, 45d of the composite optical detector 45 by refracting operations provided in the collimator lens 33 and the hologram element 32.

The convergence operation of the above-mentioned −1-order diffraction lights 43a2, 43b2 is shown in FIG. 10 and FIG. 16 described later.

The divide-by-2 optical detectors 44a, 44b and the divide-by-2 optical detectors 45a, 45b are located in a symmetrical position about the optical axis 49. Also, the divide-by-2 optical detectors 44c, 44d and the divide-by-2 optical detectors 45c, 45d are located in symmetrical position about the optical axis 49.

In the embodiment, the +1-order diffraction lights 43a1, 43b1 provided from the areas 32a, 32b of the hologram element 32 are used for generating the focus error signal FES, and the −1-order diffraction lights 43a2, 43b2 provided from the areas 32a, 32b of the hologram element 32 are used for generating the tracking error signal TES.

Namely, the focus error signal FES is generated by an FES generation circuit comprising adder circuits 57a, 57b and a differential circuit 58a based on the output signals of the composite optical detectors 44a to 44d. The output signals of the composite detectors 44a to 44d are represented by 44a to 44d, respectively, for the convenience of the description. The focus error signal FES is obtained based on a Fourcault method as follows:

$$FES = (44a + 44c) - (44b + 44d) \qquad (2)$$

In the following, the Fourcault method will be described.

Figure 11A:
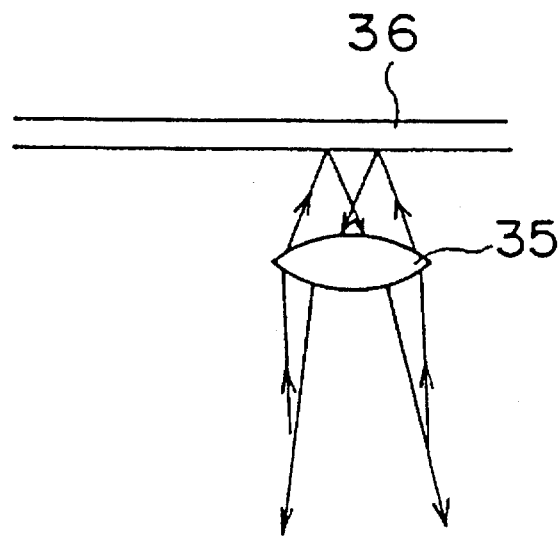
FIG. 11A to FIG. 11C show a variation of the reflected optical beam from a magneto-optical disk according to a distance between an object lens and the magneto-optical disk.
Figure 11B:
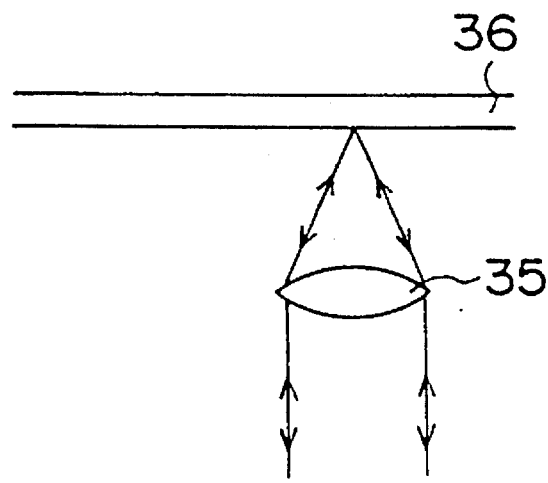
Figure 11C:
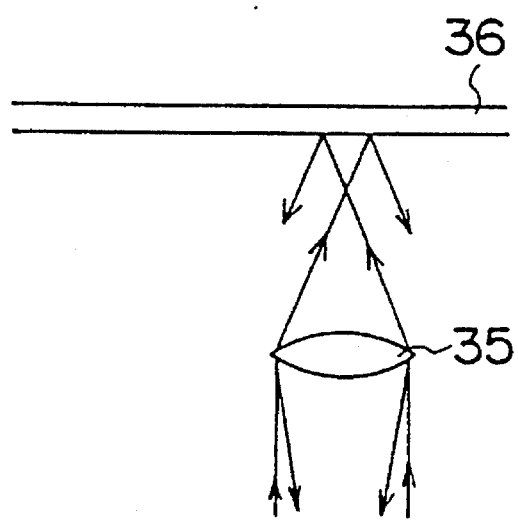

FIG. 11A to FIG. 11C show a variation of the reflected optical beam from the magneto-optical disk 36 according to the distance between the object lens 35 and the magneto-optical disk 36. FIG. 11A shows a case where the object lens 35 is close to the magneto-optical disk 36, and a just focus point is positioned above the magneto-optical disk 36. FIG. 11B shows a case where the just focus point is positioned at the magneto-optical disk 36. FIG. 11C shows a case where the object lens 35 is apart from the magneto-optical disk 36, and the just focus point is located between the magneto-optical disk 36 and the object lens 35.

Figure 12A:
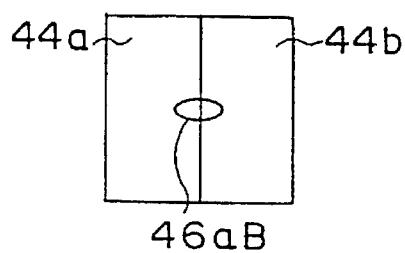
FIGS. 12A, 12B show spots formed on composite optical detectors in a condition shown in FIG. 11A.
Figure 12B:
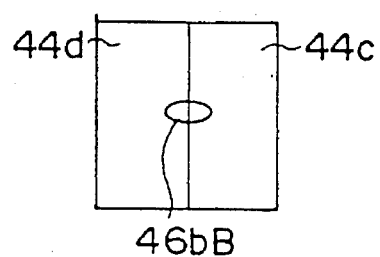
Figure 13A:
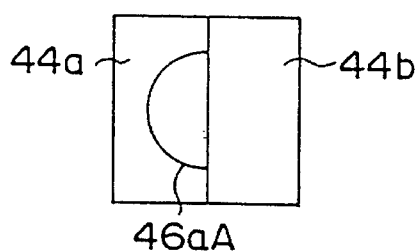
FIGS. 13A, 13B show spots formed on composite optical detectors in a condition shown in FIG. 11B.
Figure 13B:
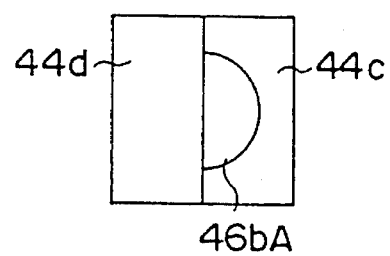
Figure 14A:
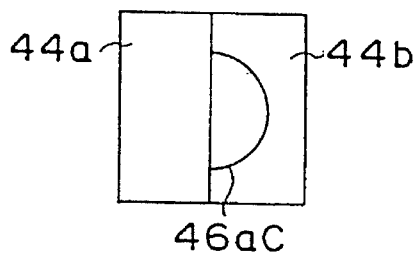
FIGS. 14A, 14B show spots formed on composite optical detectors in a condition shown in FIG. 11C.
Figure 14B:
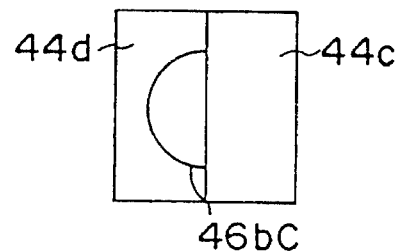

FIGS. 12A, 12B to FIGS. 14A, 14B show a variation of the spots 46a, 46b formed on the composite optical detectors 44a to 44d as the distance between the object lens 35 and the magneto-optical disk 36 is changed as shown in FIGS. 11A to 11C. FIGS. 12A, 12B show the spots 46a, 46b formed on the composite optical detectors 44a to 44d in the condition shown in FIG. 11A. FIG. 12A shows a spot 46aB formed on the divide-by-2 optical detectors 44a, 44b, and FIG. 12B shoes a spot 46bB formed on the divide-by-2 optical detectors 44c, 44d. FIGS. 13A, 13B show the spots 46a, 46b formed on the composite optical detectors 44a to 44d in the condition shown in FIG. 11B. FIG. 13A shows a spot 46aA formed on the divide-by-2 optical detectors 44a, 44b, and FIG. 13B shoes a spot 46bA formed on the divide-by-2 optical detectors 44c, 44d. FIGS. 14A, 14B show the spots 46a, 46b formed on the composite optical detectors 44a to 44d in the condition shown in FIG. 11C. FIG. 14A shows a spot 46aC formed on the divide-by-2 optical detectors 44a, 44b, and FIG. 14B shows a spot 46bC formed on the divide-by-2 optical detectors 44c, 44d.

Figure 1:
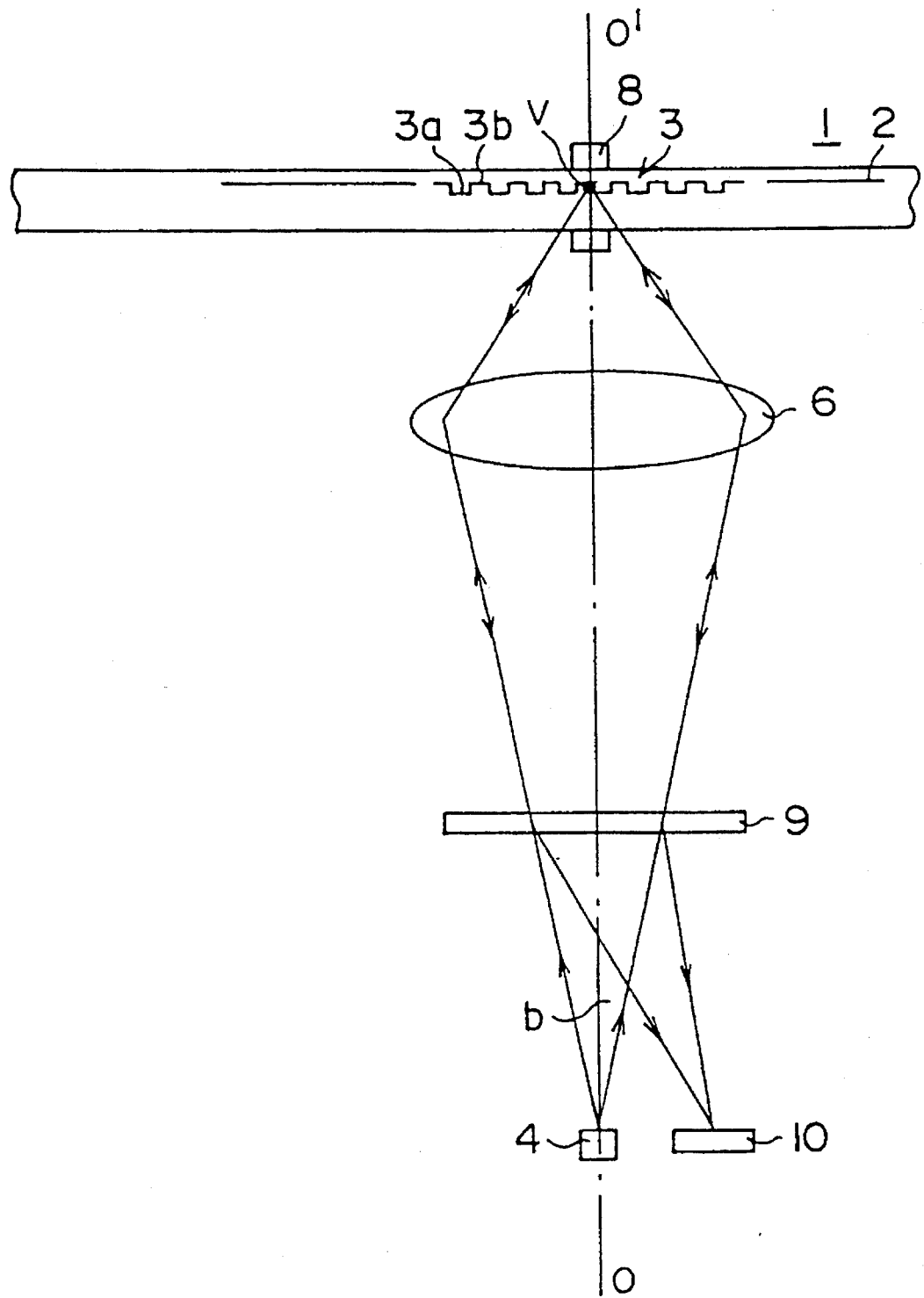
FIG. 1 shows a configuration of a first conventional optical system.
Figure 15:
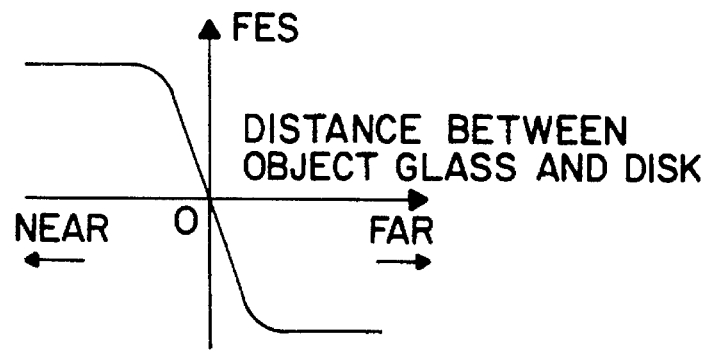
FIG. 15 shows a relationship between a focus error signal FES generated in an FES generation circuit shown in FIG. 9 and a distance between the object lens and the magneto-optical disk.

FIG. 15 shows a relationship between the focus error signal FES generated in the FES generation circuit shown in FIG. 9 and the distance between the object lens 35 and the magneto-optical disk 36. In FIG. 15, a vertical axis represents the focus error signal FES, and a horizontal axis represents the distance between the object lens 35 and the magneto-optical disk 36. In an ideal condition, when the beam spot is in the just focus state on the magneto-optical disk 36, the focus error signal FES becomes 0, and the focus error signal FES, which changes in S-like shape according to the distance between the object lens 35 and the magneto-optical disk 36 shown in FIG. 15, is obtained. In FIG. 15, in the horizontal axis, the origin (0) is the just focus point, and the distance is decreased for the left side and the distance is increased for the right side. The focus servo is carried out by using such a focus error signal FES.

Next, a description will be given of the tracking operation of the first embodiment. The tracking error signal TES is generated by the TES generation circuit including the adder circuits 57c, 57d and the differential circuit 58b based on the output signals of the composite optical detectors 45a to 45d shown in FIG. 9. The output signals of the composite detectors 45a to 45d are represented by 45a to 45d, respectively, for the convenience of the description. The tracking error signal TES is obtained based on a push-pull method as follows:

$$TES = (45a + 45c) - (45b + 45d) \quad (3)$$

First, a tracking operation when no beam shift occurs will be discussed, by referring to FIGS. 16A, 16B, 16C, 16D to FIGS. 18A, 18B, 18C, 18D.

FIG. 16A to FIG. 16D show illustrations for explaining a generating process of the tracking error signal in the first embodiment of the optical information recording-and-reproducing unit when the beam spot is on the track. FIG. 17A to FIG. 17D show illustrations for explaining the generating process of the tracking error signal in the first embodiment of the optical information recording-and-reproducing unit when the beam spot is shifted from the track to the right side. FIG. 18A to FIG. 18D show illustrations for explaining the generating process of the tracking error signal in the first embodiment of the optical information recording-and-reproducing unit when the beam spot is shifted from the track to the left side.

Figure 18A:
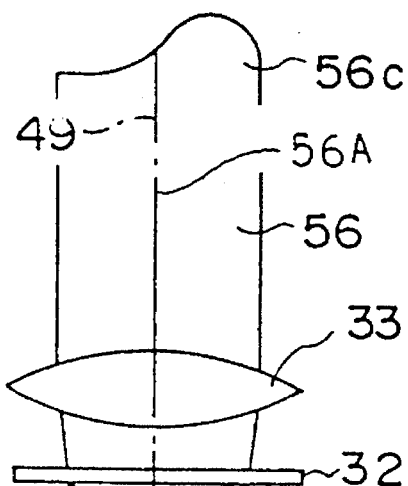
FIG. 18A to FIG. 18D show illustrations for explaining the generating process of the tracking error signal in the first embodiment of the optical information recording-and-reproducing unit when the beam spot is shifted from the track to the left side.

The optical beam is focused on the magneto-optical disk 36 by the object lens 35 as a small beam spot, for example, less than 1-μm diameter spot. When the beam spot is diffracted by the track on the magneto-optical disk 36, intensity distribution of a reflected optical beam 56 from the magneto-optical disk 36 changes in a vertical plane of the optical axis according to a variation of the locational relationship between the beam spot and the track as shown in FIGS. 16A, 17A, 18A. In FIG. 16B, the reflected optical beam 56 is diffracted in the hologram element 32 and is provided to the composite optical detectors 45a to 45d (45 in FIG. 16B). FIG. 16C shows intensity distributions 56b1, 56b2 of the −1-order diffraction lights 43a2, 43b2 on the divide-by-2 optical detectors 45a, 45b and the divide-by-2 optical detectors 45c, 45d. FIG. 16D shows a relationship between the divide-by-2 optical detectors 45a, 45b and the spot 47a of the −1-order diffraction light 43a2, and a relationship between the divide-by-2 optical detectors 45c, 45d and the spot 47b of the −1-order diffraction light 43b2. In this condition, a central axis 56A of the reflected light 56 is identical to the optical axis 49.

When the beam spot on the magneto-optical disk 36 shown in FIG. 16B is shifted from the track to the right side as shown in FIG. 17B, the intensity distribution of the reflected optical beam 56 from the magneto-optical disk 36 is changed as distribution 56a shown in FIG. 17A, wherein the intensity on the left side is increased. The reflected optical beam 56 is diffracted in the hologram element 32 and is provided to the composite optical detectors 45 (45a to 45d). FIG. 17C shows intensity distributions 56a1, 56a2 of the −1-order diffraction lights 43a2, 43b2 on the divide-by-2 optical detectors 45a, 45b and the divide-by-2 optical detectors 45c, 45d. FIG. 17D shows the relationship between the divide-by-2 optical detectors 45a, 45b and the spot 47a of the −1-order diffraction light 43a2, and the relationship between the divide-by-2 optical detectors 45c, 45d and the spot 47b of the −1-order diffraction light 43b2. In this condition, the central axis 56A of the reflected light 56 is identical to the optical axis 49. An amount of light provided to the divide-by-2 optical detectors 45b, 45d becomes larger than that provided to the divide-by-2 optical detectors 45a, 45c. As a result, in the condition shown in FIGS. 17A to 17D, from the equation (3), a relation TES<0 is established.

Figure 18B:
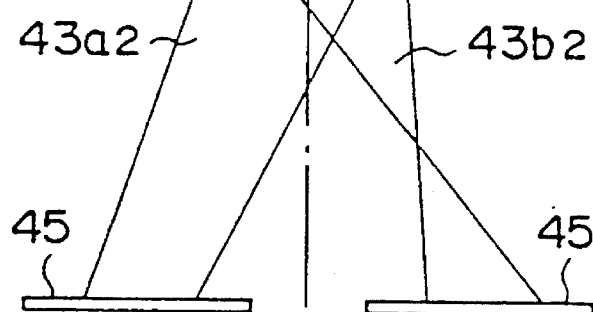
Figure 18C:
Figure 18D:
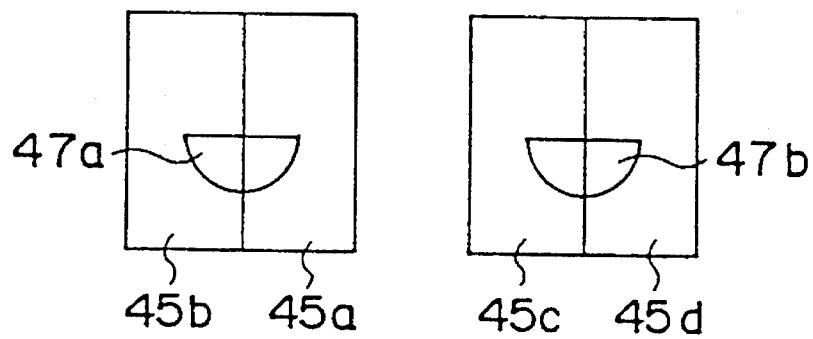

On the other hand, when the beam spot on the magneto-optical disk 36 shown in FIG. 16B is shifted from the track to the left side as shown in FIG. 18B, the intensity distribution of the reflected optical beam 56 from the magneto-optical disk 36 is changed as distribution 56c shown in FIG. 18A, wherein the intensity on the right side is increased. The reflected optical beam 56 is diffracted in the hologram element 32 and is provided to the composite optical detectors 45 (45a to 45d). FIG. 18C shows intensity distributions 56c1, 56c2 of the −1-order diffraction lights 43a2, 43b2 on the divide-by-2 optical detectors 45a, 45b and the divide-by-2 optical detectors 45c, 45d. FIG. 18D shows the relationship between the divide-by-2 optical detectors 45a, 45b and the spot 47a of the −1-order diffraction light 43a2, and the relationship between the divide-by-2 optical detectors 45c, 45d and the spot 47b of the −1-order diffraction light 43b2. In this condition, the central axis 56A of the reflected light 56 is identical to the optical axis 49. An amount of light provided to the divide-by-2 optical detectors 45a, 45c becomes larger than that provided to the divide-by-2 optical detectors 45b, 45d. As a result, in the condition shown in FIGS. 18A to 18D, from the equation (3), a relation TES>0 is established.

Accordingly, by using the tracking error signal TES generated based on the above equation (3), the tracking servo operation may be carried out.

Figure 19A:
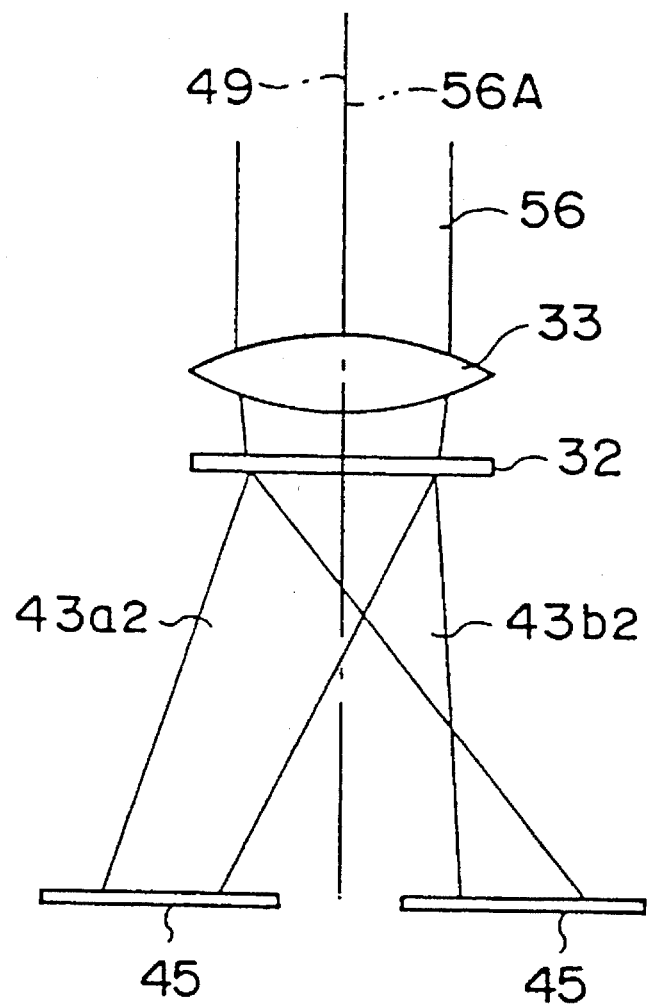
FIG. 19A and FIG. 19B show illustrations for explaining the generating process of the tracking error signal in the first embodiment of the optical information recording-and-reproducing unit when no beam shift occurs.
Figure 19B:
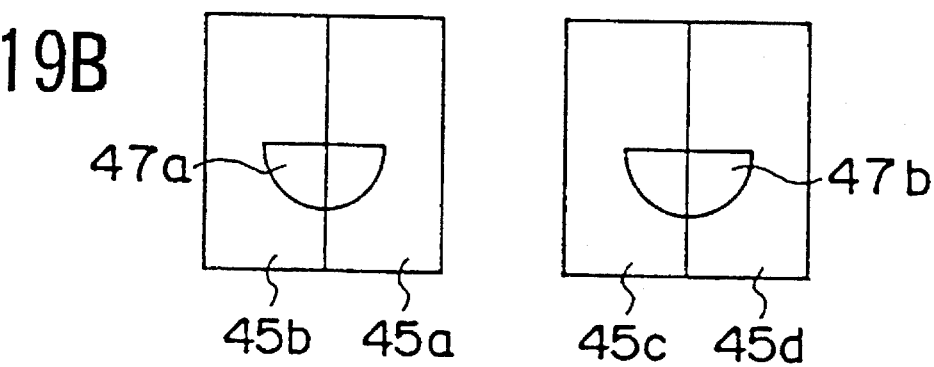
Figure 20A:
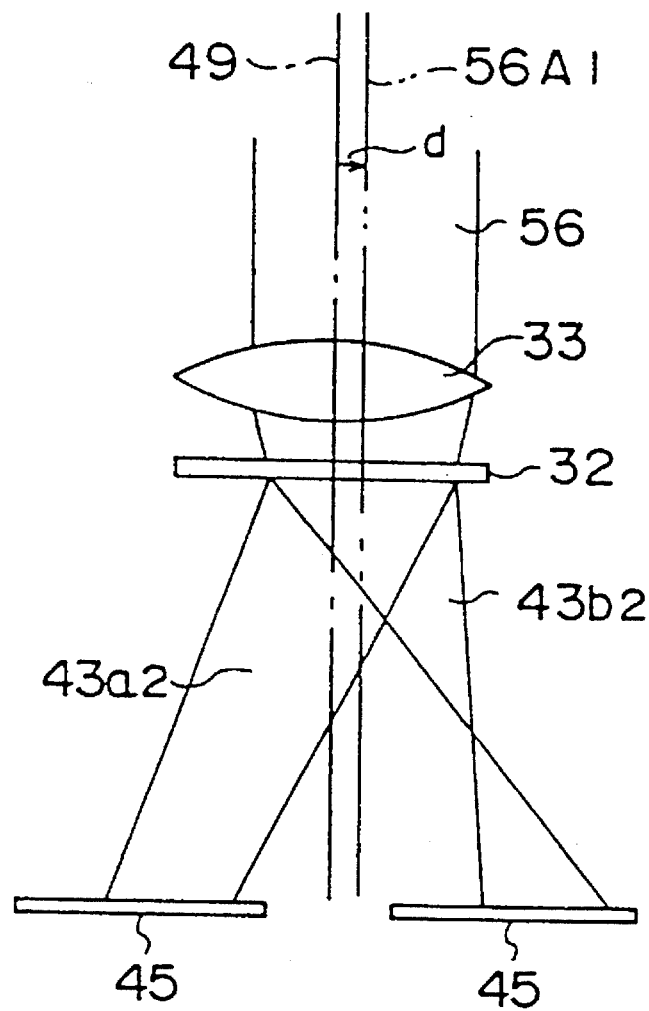
FIG. 20A and FIG. 20B show illustrations for explaining the generating process of the tracking error signal in the first embodiment of the optical information recording-and-reproducing unit when the beam spot is shifted from the optical axis to the right side by the beam shift.
Figure 20B:
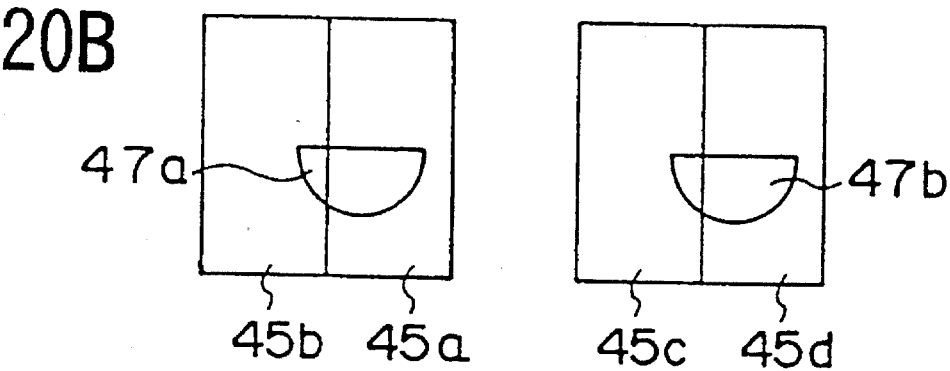
Figure 21A:
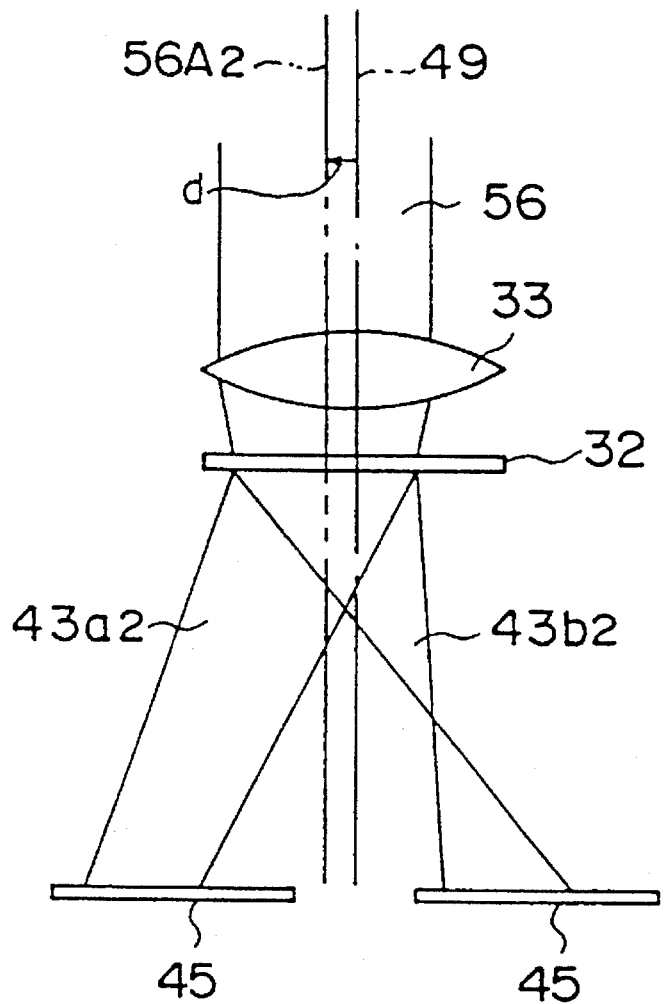
FIG. 21A and FIG. 21B show illustrations for explaining the generating process of the tracking error signal in the first embodiment of the optical information recording-and-reproducing unit when the beam spot is shifted from the optical axis to the left side by the beam shift.
Figure 21B:
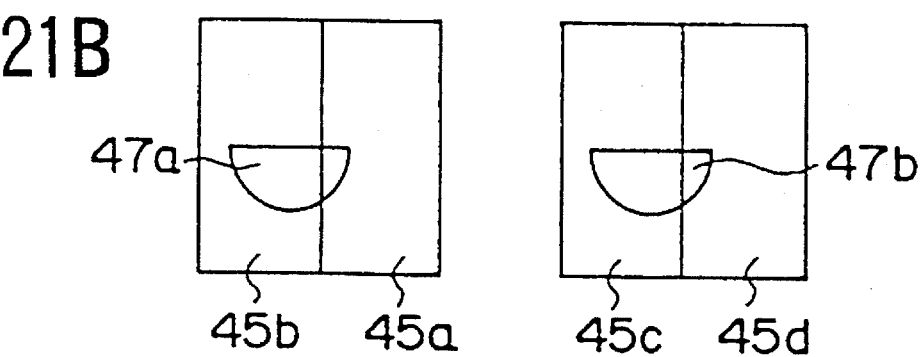

Next, a tracking operation when the beam shift occurs will be discussed by referring to FIGS. 19A. 19B to FIGS. 21A, 21B. FIG. 19A and FIG. 19B show illustrations for explaining the generating process of the tracking error signal in the first embodiment of the optical information recording-and-reproducing unit when no beam shift occurs. FIG. 20A and FIG. 20B show illustrations for explaining the generating process of the tracking error signal in the first embodiment of the optical information recording-and-reproducing unit when the beam spot is shifted from the optical axis to the right side by the beam shift. FIG. 21A and FIG. 21B show illustrations for explaining the generating process of the tracking error signal in the first embodiment of the optical information recording-and-reproducing unit when the beam spot is shifted from the optical axis to the left side by the beam shift. Elements in FIGS. 19A. 19B to FIGS. 21A, 21B which are the same as those of FIGS. 16A. 16B to FIGS. 18A, 18B are given the same reference numerals.

In general, the beam shift is caused by position change of optical components, fluctuation of the plane of the storage medium during the rotation of the magneto-optical disk 36, etc. When the beam shift occurs, the central axis of the beam spot is shifted from the optical axis which is the central axis for detecting the intensity distribution of the beam spot.

FIG. 19A shows the reflected optical beam 56 (−1-order diffraction lights 43a2, 43b2) which is provided to the composite optical detectors 45 (45a to 45d) through the collimator lens 33 and the hologram element 32, and FIG. 19B shows the relationship between the divide-by-2 optical detectors 45a, 45b and the spot 47a of the −1-order diffraction light 43a2, and the relationship between the divide-by-2 optical detectors 45c, 45d and the spot 47b of the −1-order diffraction light 43b2. In this condition, the central axis 56A of the reflected light 56 is identical to the optical axis 49. Further, the −1-order diffraction light 43a2 is detected in the far-field state before convergence by the divide-by-2 optical detectors 45a, 45b, and the −1-order diffraction light 43b2 is detected in the far-field state after convergence by the divide-by-2 optical detectors 45c, 45d.

When the beam shift is caused by position change of the optical components, fluctuation of the plane of the storage medium during the rotation of the magneto-optical disk 36, etc., even if the beam spot is regularly arranged on the track of the magneto-optical disk 36, a central axis 56A1 of the reflected optical beam 56 may be shifted from the optical axis 49, by, for example, a distance d to the right side, as shown in FIG. 20A. In this case, the positions of the −1-order diffraction lights 43a2, 43b2 on the composite optical detectors 45a to 45d are also shifted to the right side as shown in FIG. 20B. Therefore, though an amount of light provided to the optical detector 45a becomes larger than that provided to the optical detector 45b, an amount of light provided to the optical detector 45d becomes larger than that provided to the optical detector 45c. Namely, since −1-order diffraction light 43a2 is detected in the far-field state before convergence by the divide-by-2 optical detectors 45a, 45b, an increased amount of light provided to the optical detectors 45a, 45d is substantially equal to a decreased amount of light provided to the optical detectors 45b, 45c. As a result, the tracking error signal TES is represented by TES=(45a+45c)−(45b+45d)=0, from the equation (3). Accordingly, even if a beam shift is caused, regular tracking error signal TES may be obtained.

In the same way, when a beam shift is caused, even if the beam spot is regularly arranged on the track of the magneto-optical disk 36, a central axis 56A2 of the reflected optical beam 56 may be shifted from the optical axis 49, by, for example, a distance d to the left side, as shown in FIG. 21A. In this case, the positions of the −1-order diffraction lights 43a2, 43b2 on the composite optical detectors 45a to 45d are also shifted to the left side as shown in FIG. 21B. Therefore, though an amount of light provided to the optical detector 45b becomes larger than that provided to the optical detector 45a, an amount of light provided to the optical detector 45c becomes larger than that provided to the optical detector 45d. Namely, since −1-order diffraction light 43b2 is detected in the far-field state after convergence by the divide-by-2 optical detectors 45c, 45d, an increased amount of light provided to the optical detectors 45b, 45c is substantially equal to the decreased amount of light provided to the optical detectors 45a, 45d. As a result, the tracking error signal TES is represented by TES=(45a+45c)−(45b+45d)≈0, from the equation (3). This means that even if the beam shift is caused, the regular tracking error signal TES may also be obtained.

In this way, when the beam shift occurs, if the beam spot is regularly arranged on the track of the magneto-optical disk 36, the tracking error signal TES is maintained at approximately 0. Therefore, little offset occurs in the tracking error signal TES. When the tracking servo operation is carried out using such a tracking error signal having little offset, the beam spot may always scan the track on the magneto-optical disk 36 regularly. Accordingly, occurrence of a reproduction error is easily prevented.

In the first embodiment, in the diffraction light provided from the hologram element 32, the focus error signal FES is generated by using the +1-order diffraction lights 43a1, 43b1, and the tracking error signal TES is generated by using the −1-order diffraction lights 43a2, 43b2. Therefore, it is not necessary to use a specific hologram which has a configuration increasing an amount of the +1-order diffraction lights 43a1, 43b1 or the −1-order diffraction lights 43a2, 43a2. Thus, a less expensive hologram element may be used.

In the reflected optical beam which is reflected on the magneto-optical disk 36 and is provided to the hologram element 32, the −1-order diffraction light 43a2 provided from the area 32a of the hologram element 32 is provided as the spot 47a in the far-field state before convergence on the divide-by-2 optical detectors 45a, 45b, by the refraction function provided in the collimator lens 33 and the hologram element 32. On the other hand, in the reflected optical beam which is reflected on the magneto-optical disk 36 and is provided to the hologram element 32, the −1-order diffraction light 43b2 provided from the area 32b of the hologram element 32 is provided as the spot 47b in the far-field state after convergence on the divide-by-2 optical detectors 45c, 45d, by the refraction function provided in the collimator lens 33 and the hologram element 32. Therefore, even if the beam shift occurs, the increased amount of light provided to the optical detectors 45a, 45d is almost the same as the decreased amount of light provided to the optical detectors 45b, 45c, and the decreased amount of light provided to the optical detectors 45a, 45d is almost the same as the increased amount of light provided to the optical detectors 45b, 45c. Accordingly, if the beam spot is regularly arranged on the track of the magneto-optical disk 36, the tracking error signal TES is maintained at approximately 0. As a result, the offset does not occur in the tracking error signal TES. In this way, a tracking error signal TES having no offset may always be obtained, and the possibility of an occurrence of a reproduction error is greatly reduced.

The object lens 35 is supported for movement, by a supporting mechanism which is omitted in FIG. 9, along two axes, a first axis being a direction of the fluctuation of the plane of the magneto-optical disk 36 and a second axis being a radial direction of the magneto-optical disk 36. In fact, a magnetic circuit (not shown) which moves the object lens 35 in the two axial directions is provided. When a control signal based on the focus error signal FES and the tracking error signal TES is applied to a coil of the magnetic circuit, a position of the object lens 35 supported by the supporting mechanism may be controlled to perform the desired focus servo and tracking servo. For the supporting mechanism and the magnetic circuit, conventional circuits are used. The focus servo and the tracking servo are also well known. Therefore, these illustrations and descriptions are omitted in this specification.

Further, position arrangement of the optical detectors 44a to 44d and 45a to 45d is not limited to the embodiment shown in FIG. 9 and FIG. 10. Therefore, if the tracking error signal and the focus error signal can be obtained by the same optical detection principle as that shown in FIG. 9 and FIG. 10, the optical detectors 44a to 44d and 45a to 45d may be arranged in any position.

Figure 22:
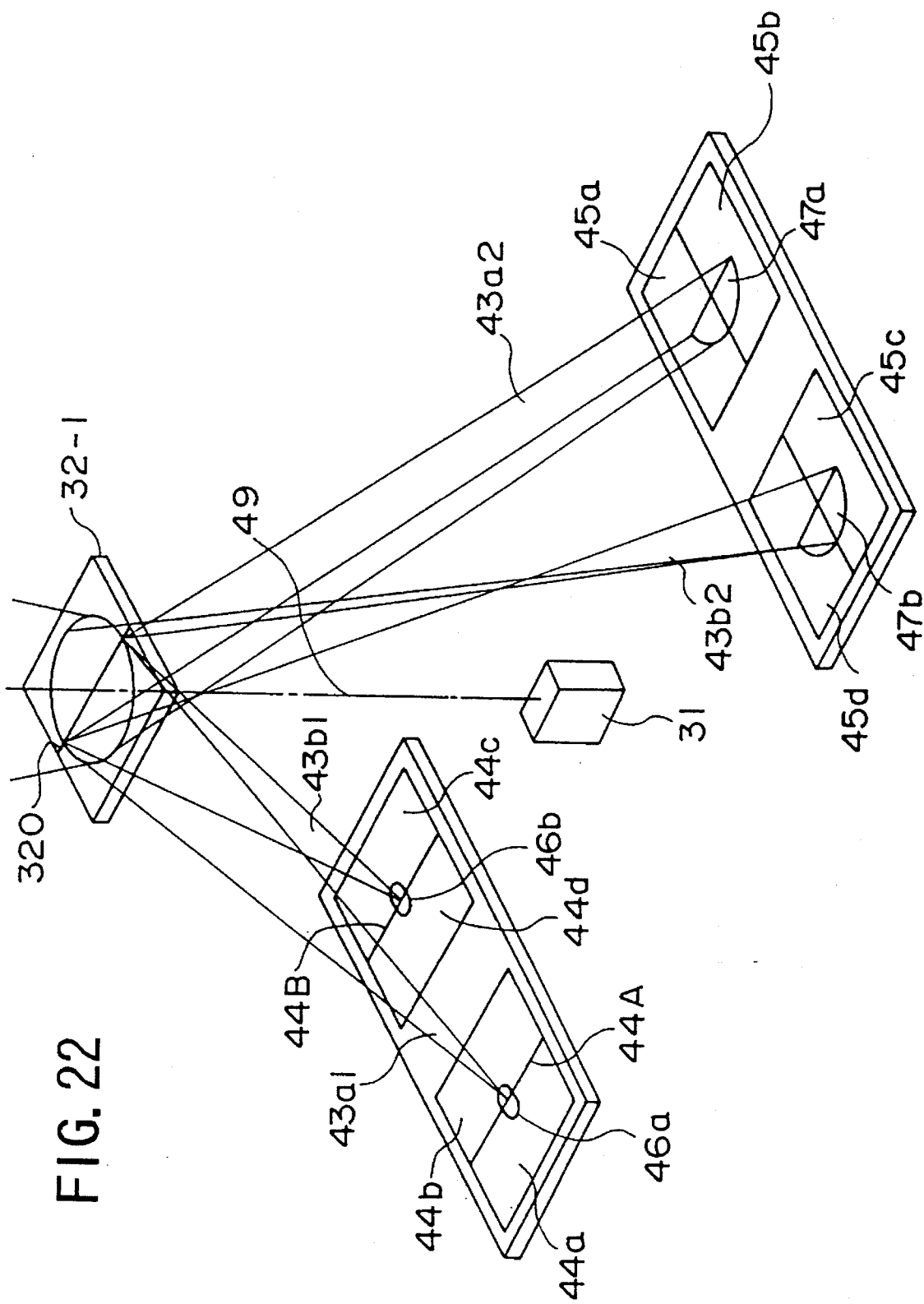
FIG. 22 shows a perspective view of optical detectors of a first modification of the first embodiment of the optical information recording-and-reproducing unit according to the present invention.

FIG. 22 shows a perspective view of the optical detectors 44a to 44d and 45a to 45d of a first modification of the first embodiment of the optical information recording-and-reproducing unit according to the present invention. Elements in FIG. 22 which are the same as those of FIG. 9 and FIG. 10 are given the same reference numerals. In the first modification shown in FIG. 22, the positions of the divide-by-2 optical detectors 44c, 44d the positions of the divide-by-2 optical detectors 45c, 45d are exchanged with each other. A hologram element 32-1 diffracts the reflected optical beam according to the positions of the optical detectors 44a to 44d, 45a to 45d. In the first modification, in the same way as the composite optical detectors 44, 45 shown in FIG. 9 and FIG. 10, the composite optical detectors 44, 45 can be arranged in a crossing direction of the dividing line 320 of the hologram 32-1 at substantially a right angle.

In this modification, when the position of the hologram element 32-1 is adjusted by rotating it about the optical axis 49 so that beam spots 46a, 46b can, respectively, be formed on dividing lines 44A, 44B of the composite detector 44, a larger rotation is required as compared to the embodiment shown in FIG. 9 and FIG. 10. Therefore, in this modification, accuracy of the position adjustment of the composite optical detector 44 is improved as compared to the embodiment shown in FIG. 9 and FIG. 10. However, when the same relative shifts between the beam spots 46a, 46b and the dividing lines 44A, 44B are adjusted, a large rotation of the composite optical detector 44 is required as compared to the embodiment shown in FIG. 9 and FIG. 10. Thus, either of the positions shown in FIG. 9 and FIG. 10 and the position shown in FIG. 22 may be selected according to the importance of the balance of accuracy of the position adjustment of the composite optical detector 44 and the amount of rotation of the composite optical detector 44.

Figure 23:
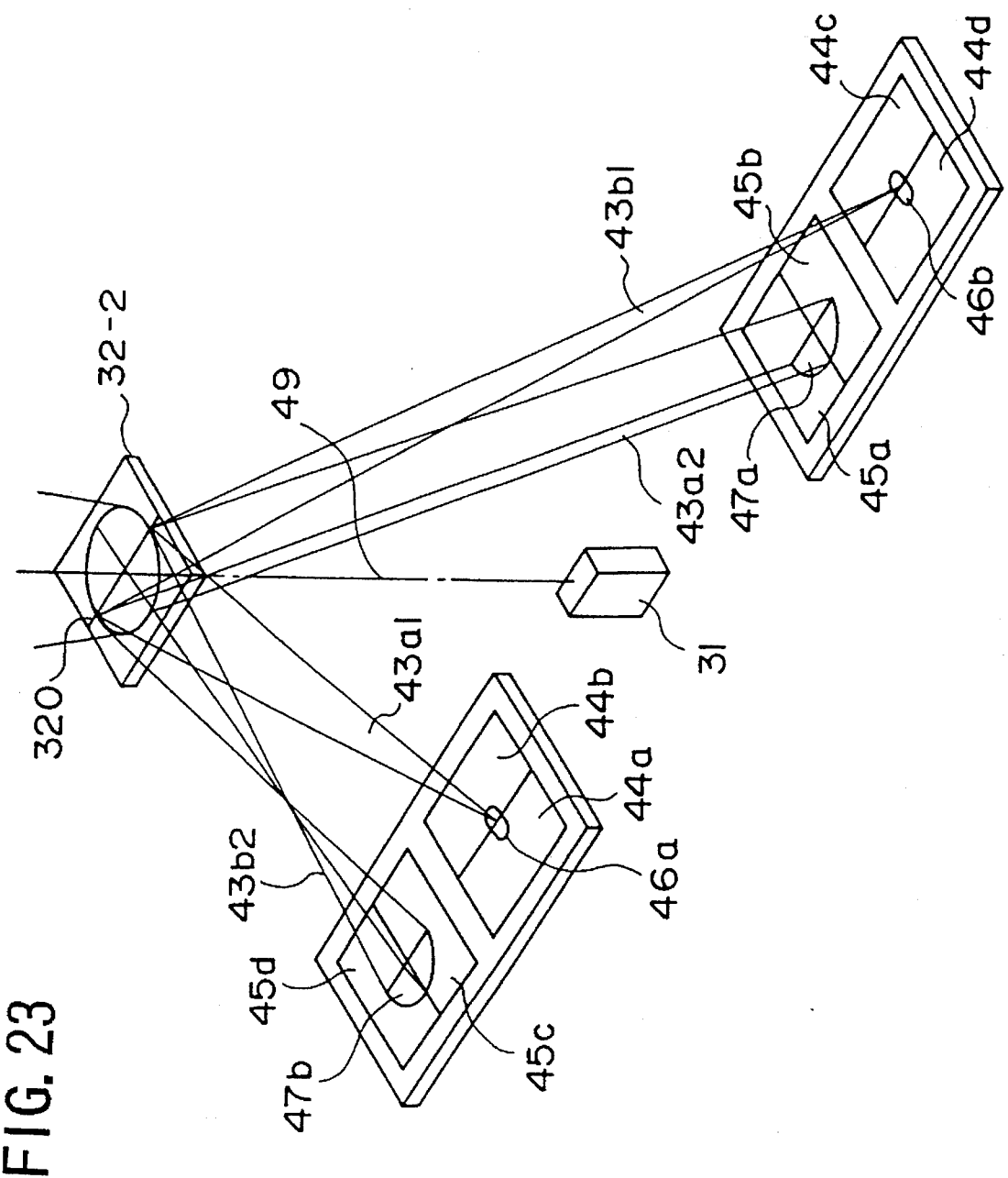
FIG. 23 shows a perspective view of the optical detectors of a second modification of the first embodiment of the optical information recording-and-reproducing unit according to the present invention.

FIG. 23 shows a perspective view of the optical detectors 44a to 44d and 45a to 45d of a second modification of the first embodiment of the optical information recording-and-reproducing unit according to the present invention. Elements in FIG. 23 which are the same as those of FIG. 9 and FIG. 10 are given the same reference numerals. In the second modification, the directional position of the composite optical detectors 44, 45 shown in FIG. 9 and FIG. 10 is approximately parallel to the direction of the dividing line 320 of a hologram 32-2.

In the second modification, the same performance as that shown in FIG. 9 and FIG. 10 may be obtained.

Figure 24:
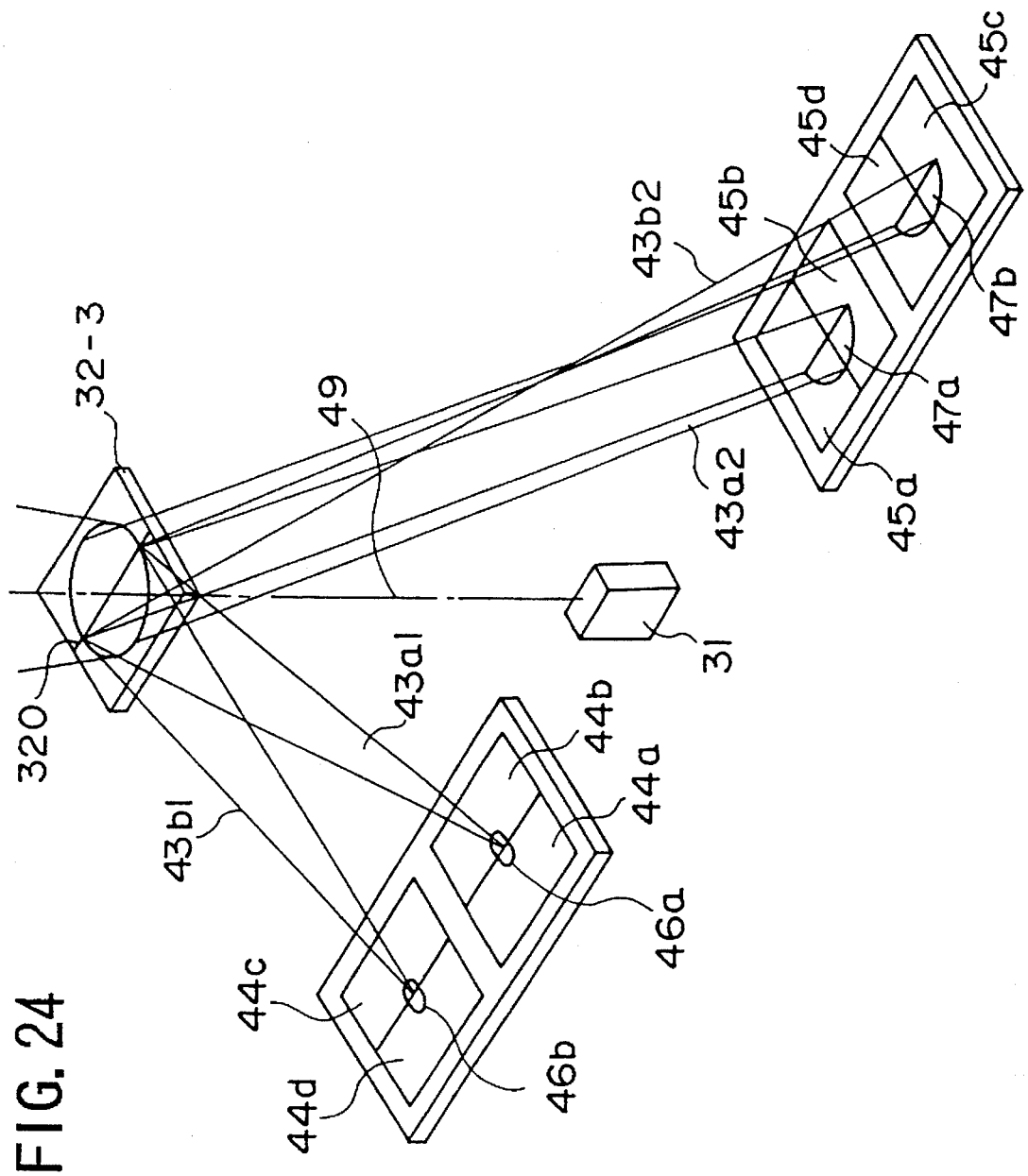
FIG. 24 shows a perspective view of the optical detectors of a third modification of the first embodiment of the optical information recording-and-reproducing unit according to the present invention.

FIG. 24 shows a perspective view of the optical detectors 44a to 44d and 45a to 45d of a third modification of the first embodiment of the optical information recording-and-reproducing unit according to the present invention. Elements in FIG. 24 which are the same as those of FIG. 22 are given the same reference numerals. In the third modification, the directional position of the composite optical detectors 44, 45 shown in FIG. 22 is approximately parallel to the direction of the dividing line 320 of a hologram 32-3.

In the third modification, the same performance as that shown in FIG. 22 may be obtained.

Figure 25:
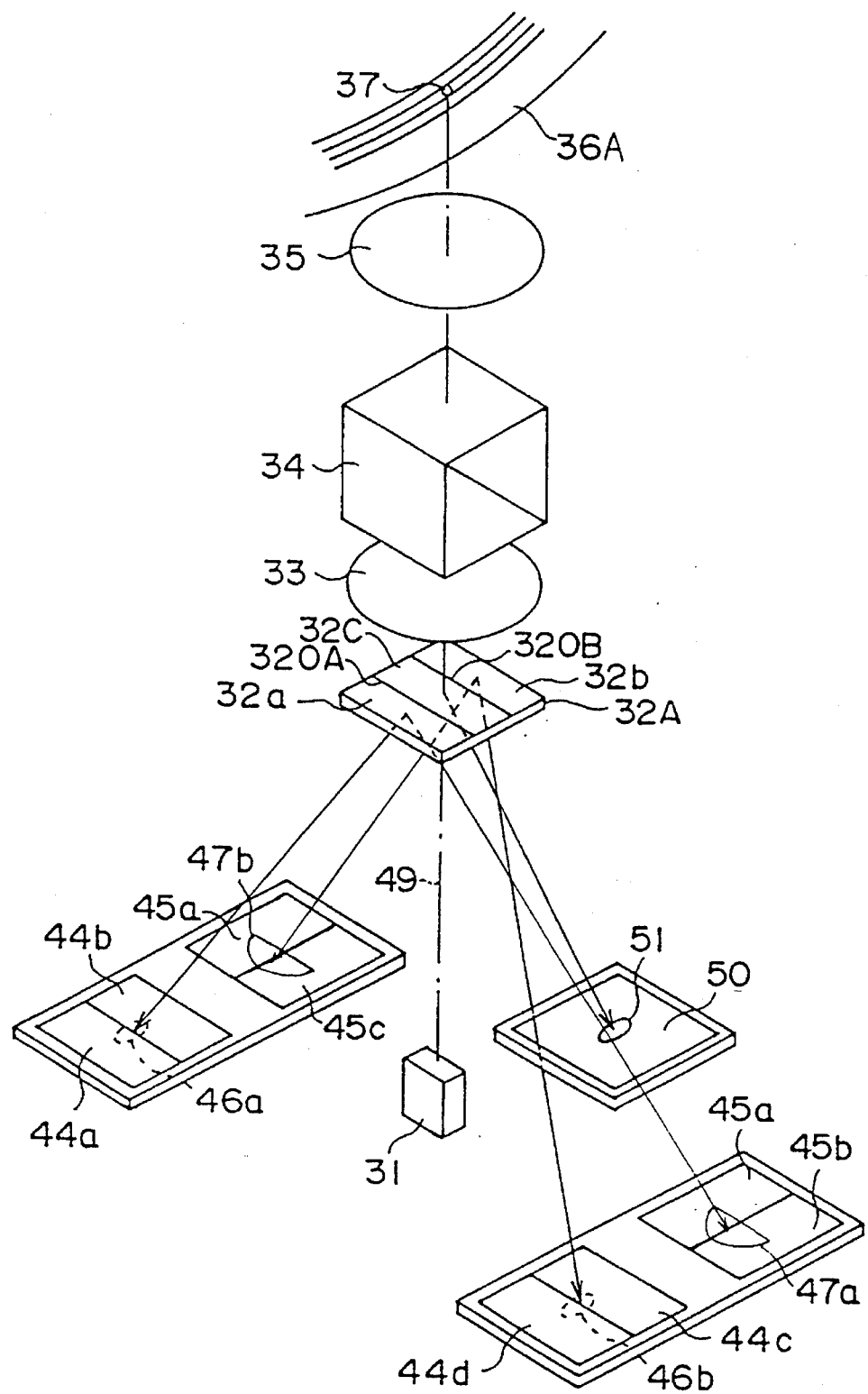
FIG. 25 shows a perspective view of the second embodiment of the optical information recording-and-reproducing unit according to the present invention.

Next, a description will be given of a second embodiment of the optical information recording-and-reproducing unit according to the present invention. FIG. 25 shows a perspective view of the second embodiment of the optical information recording-and-reproducing unit according to the present invention. Elements in FIG. 25 which are the same as those of FIG. 9 are given the same reference numerals.

In FIG. 25, an area of a hologram element 32A is divided into 3 areas 32a, 32b, 32c by two dividing lines 320A, 320B in parallel to a direction in which the intensity distribution of the reflected optical beam changes with the track of an optical disk 36A. The areas 32a, 32b located on both sides of the hologram element 32A have the same function as that of the areas 32a, 32b shown in FIG. 9. The area 32c located on the central part of the hologram element 32A has a function of providing a part of the reflected optical beam which is reflected on the optical disk 36A and is provided to the hologram element 32A to an optical detector 50 to form a spot 51. The above part is used for reproducing an RF signal. Namely, the RF signal is reproduced by an output signal of optical detector 50.

The RF signal may be reproduced based on one of the outputs of the composite optical detectors 44, 45 and the optical detector 50. In this case, though the total amount of received light increases and a signal component also increases, a connection capacitance increases and a noise component increases because the total area for receiving light in the optical detector increases. When the servo signal and the RF signal are generated in the same optical detector, an additional circuit separating the two signals in the different frequency bands is required.

Therefore, when an increase of the noise component is extremely larger than an increase of the signal component, it is preferred that the RF signal is reproduced based only on the output of the optical detector 50 as mentioned above.

When the above-mentioned first embodiment is applied to an apparatus which detects the RF signal by strength and weakness of the reflected light from the storage medium such as a compact disk unit and a phase-change-type optical disk unit, it is necessary to detect the RF signal from the total or part of the outputs of the composite optical detectors 44, 45. Therefore, the additional circuit for separating the servo signal and the RF signal in the different frequency bands is required. On the other hand, in the second embodiment, since the RF signal is reproduced based only on the output signal of the optical detector 50, the additional circuit for the frequency band separation is unnecessary.

Figure 26:
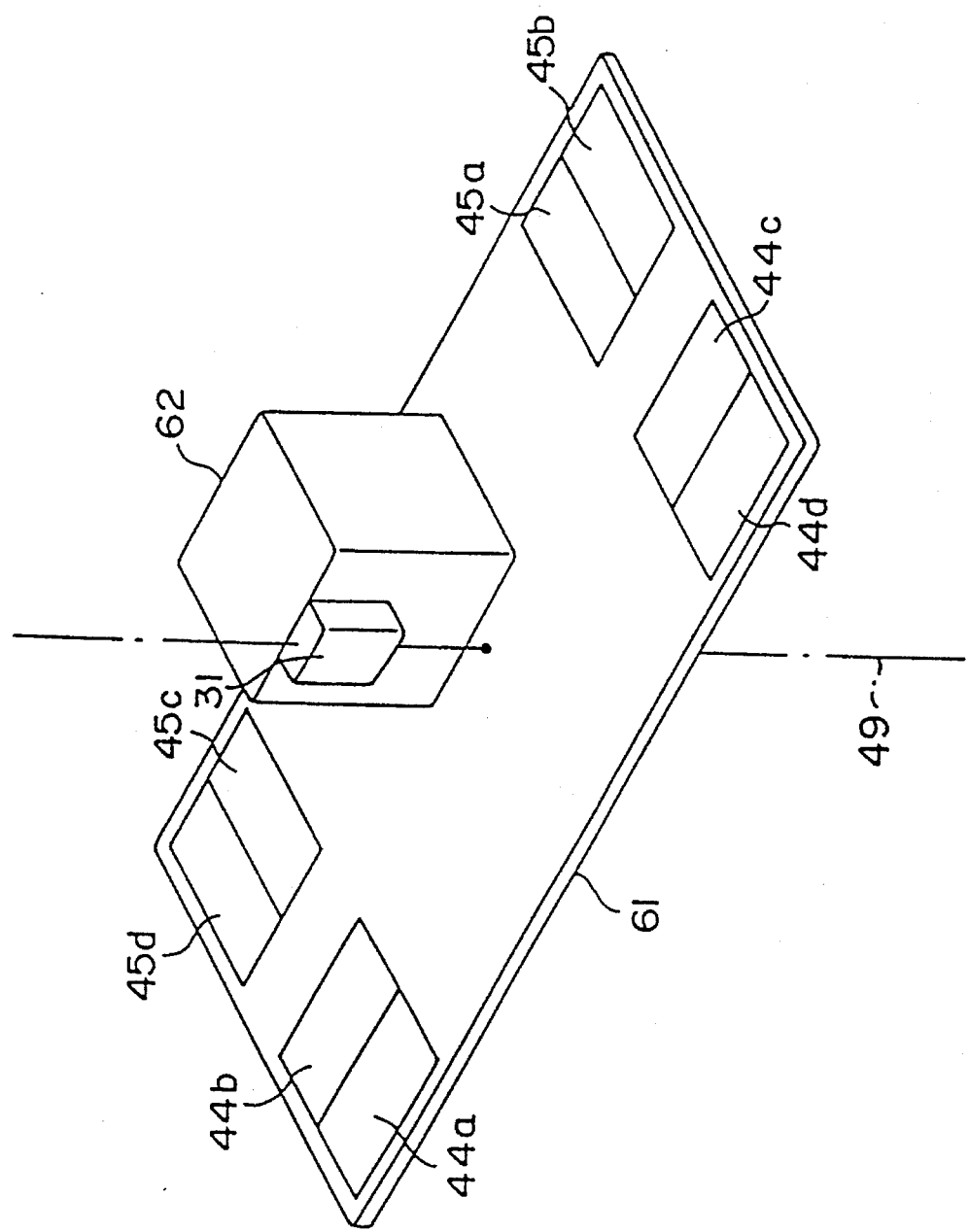
FIG. 26 shows a perspective view of a part of the third embodiment of the optical information recording-and-reproducing unit according to the present invention.

Next, a description will be given of a third embodiment of the optical information recording-and-reproducing unit according to the present invention. FIG. 26 shows a perspective view of a part of the third embodiment of the optical information recording-and-reproducing unit according to the present invention. Elements in FIG. 26 which are the same as those of FIG. 9 are given the same reference numerals.

In FIG. 26, the composite optical detector 44 (44a, to 44d) and the composite optical detector 45 (45a to 45d) are respectively installed on a single base 61. In this embodiment, the composite optical detector 44 and the composite optical detector 45 are directly formed on the base 61 which is made of a silicon, etc. The divide-by-2 optical detectors 44a, 44b and the divide-by-2 optical detectors 45a, 45b are arranged symmetrically about the optical axis 49 on the base 61. Also, the divide-by-2 optical detectors 44c, 44d and the divide-by-2 optical detectors 45c, 45d are arranged symmetrically about the optical axis 49 on the base 61.

Further, on the base 61, a supporting element 62 having a semiconductor laser 31 is provided. The supporting element 62 is made of high thermal conductive material such as copper, and has a function of supporting the semiconductor laser 31 and a function of efficiently radiating heat which is generated in the semiconductor laser 31.

In the third embodiment, since the semiconductor laser 31 and the composite optical detectors 44, 45 are installed on the single base 61, it is easy to adjust their relative positions. More specifically, when the composite optical detectors 44, 45 are directly formed on the base 61, the relative relationship between the positions of the composite optical detectors 44, 45 may be easily set and fixed. The number of components and the cost of the magneto-optical disk may be reduced. Further, since the heat generated in the semiconductor laser 31 is efficiently radiated through the supporting element 62, it prevents the heat from breaking the semiconductor laser 31 and it prevents the heat from damaging the other components such as composite optical detectors 44, 45.

Figure 27:
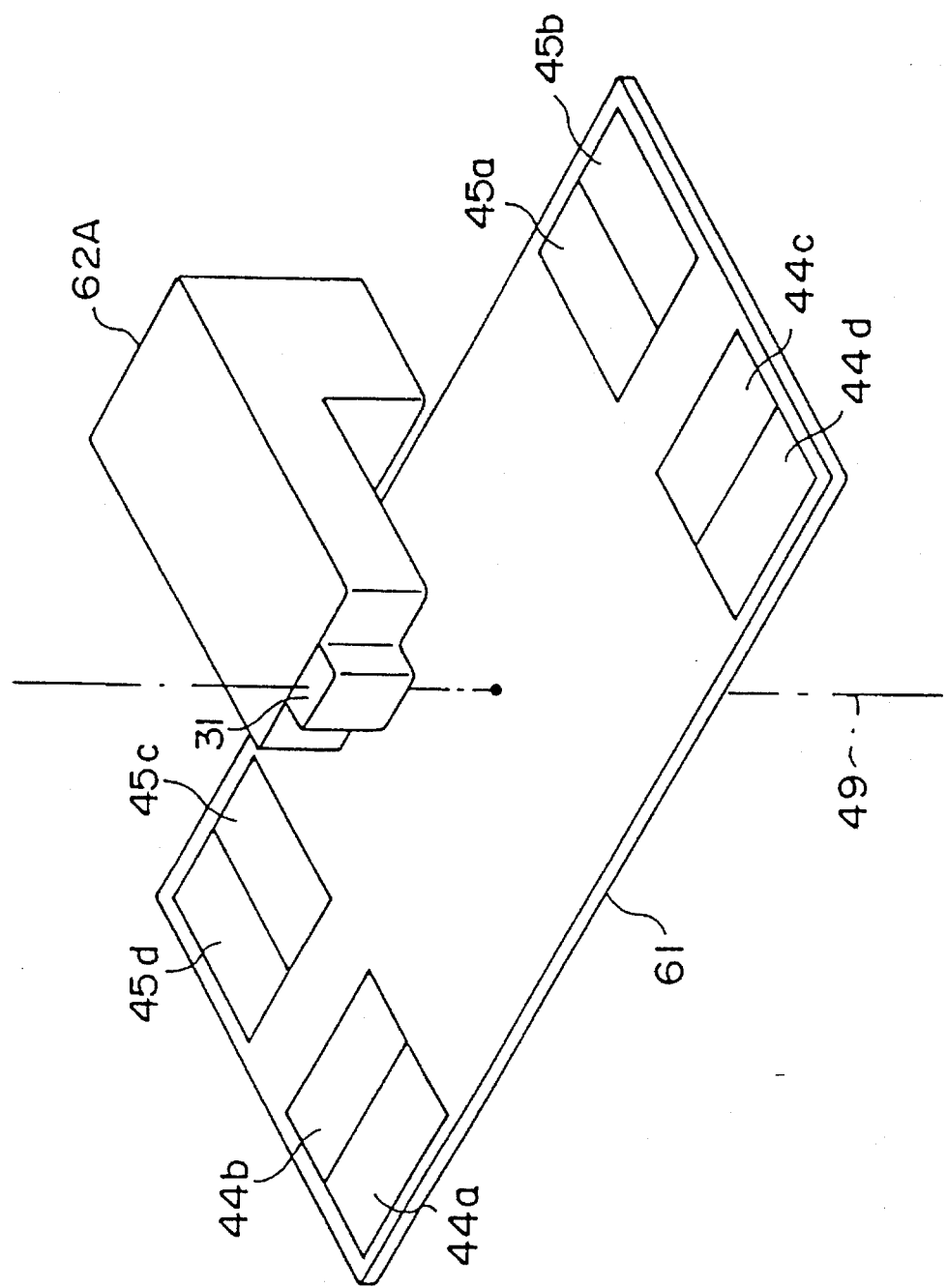
FIG. 27 shows a perspective view of a part of the fourth embodiment of the optical information recording-and-reproducing unit according to the present invention.

Next, a description will be given of a fourth embodiment of the optical information recording-and-reproducing unit according to the present invention. FIG. 27 shows a perspective view of a part of the fourth embodiment of the optical information recording-and-reproducing unit according to the present invention. Elements in FIG. 27 which are the same as those of FIG. 26 are given the same reference numerals.

In FIG. 27, an L-shaped supporting element 62A is not fixed to the base 61 but is fixed to a housing (not shown) which houses at least a part of the optical system (which will be describe later). Therefore, when the housing is formed by the high heat conductive material, the heat generated in the semiconductor laser 31 may be further efficiently radiated through the supporting element 62A and the housing.

Figure 28:
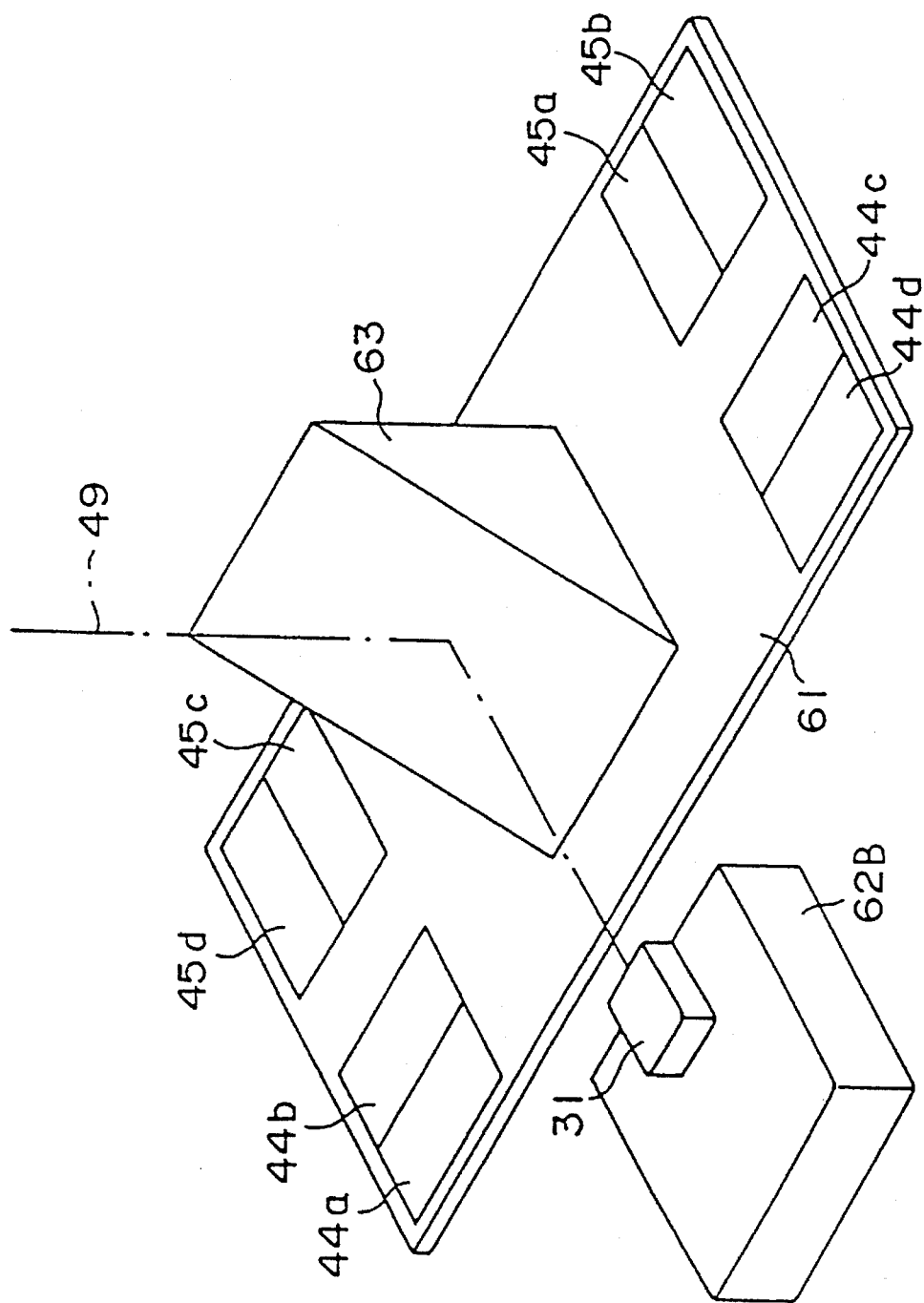
FIG. 28 shows a perspective view of a part of the fifth embodiment of the optical information recording-and-reproducing unit according to the present invention.

Next, a description will be given of a fifth embodiment of the optical information recording-and-reproducing unit according to the present invention. FIG. 28 shows a perspective view of a part of the fifth embodiment of the optical information recording-and-reproducing unit according to the present invention. Elements in FIG. 28 which are the same as those of FIG. 26 are given the same reference numerals.

In FIG. 28, a supporting element 62B is not fixed to the base 61 but is fixed to the housing (not shown) which houses at least a part of the optical system (which will be describe later). On the other hand, on the base 61, a mirror 63 is installed. The mirror 63 reflects the optical beam from the semiconductor laser 31, and provides the optical beam to the collimator lens 33 shown in FIG. 9 along the optical axis 49.

The fifth embodiment is preferred in a case where installing the semiconductor laser 31 on the base 61 is not desired.

Figure 29:
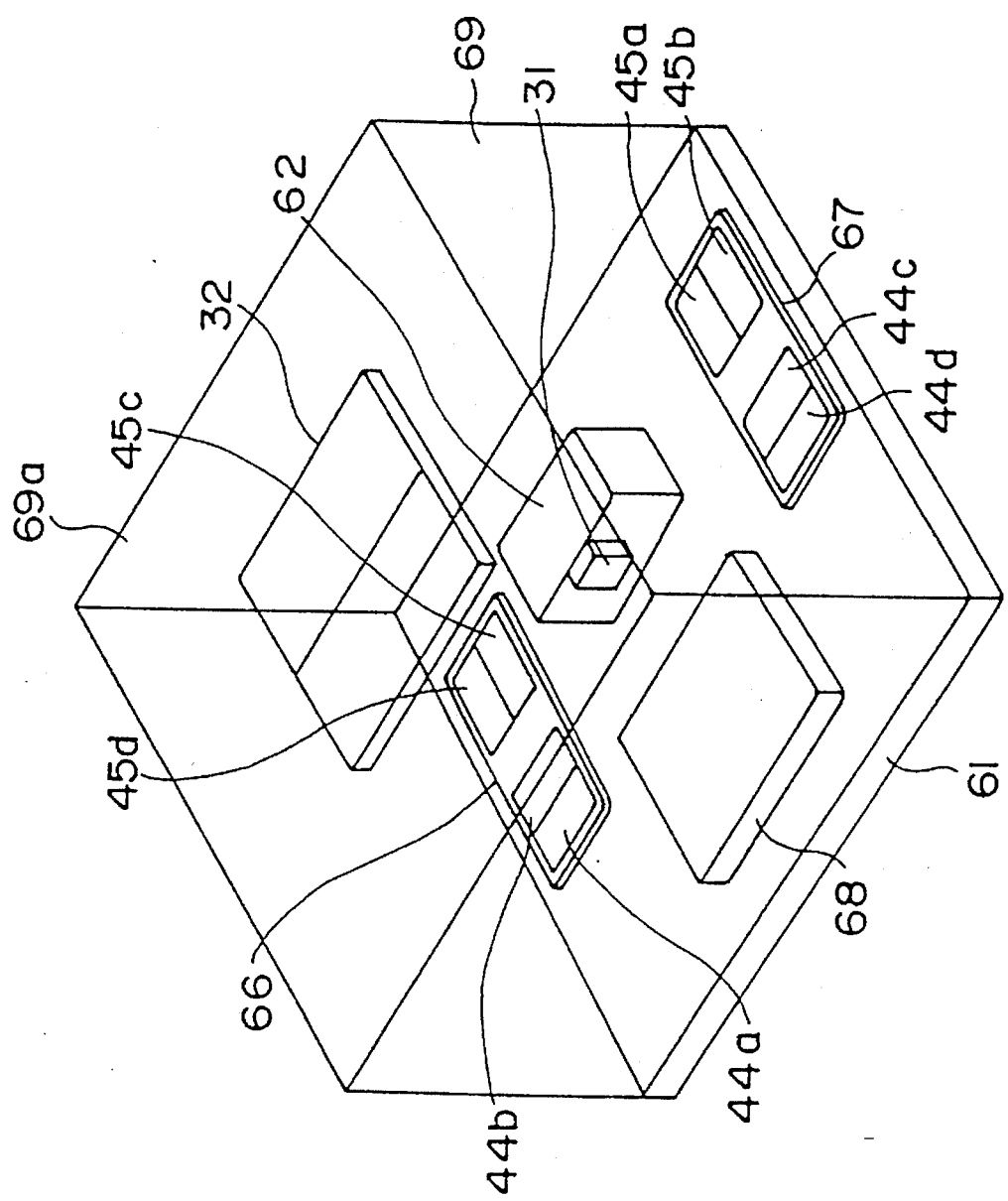
FIG. 29 shows a perspective view of a part of the sixth embodiment of the optical information recording-and-reproducing unit according to the present invention.

Next, a description will be given of a sixth embodiment of the optical information recording-and-reproducing unit according to the present invention. FIG. 29 shows a perspective view of a part of the sixth embodiment of the optical information recording-and-reproducing unit according to the present invention. Elements in FIG. 29 which are the same as those of FIG. 26 are given the same reference numerals.

In FIG. 29, on the base 61, a composite optical detector 66 comprising the optical detectors 44a, 44b and the optical detectors 45c, 45d, a composite optical detector 67 comprising the optical detectors 44c, 44d and the optical detectors 45a, 45b, the supporting element 62 for supporting the semiconductor laser 31, and a semiconductor integrated circuit 68 are installed. The semiconductor integrated circuit 68 includes the adding circuits 57a to 57e and the differential circuits 58a to 58c, etc., shown in FIG. 9. The composite optical detectors 66, 67 and the semiconductor integrated circuit 68 may be respectively formed and may be installed in the base 61. At least one of the composite optical detectors 66, 67 and the semiconductor integrated circuit 68 may be directly formed in the base 61 which is made of silicon, etc.

In FIG. 29, a housing 69 has a box-like shape and is installed on the base 61 to house elements on the base 61. In an upper-side plane 69a of the housing 69, the hologram element 32 is fixed. A position for fixing the hologram element 32 is set so that respective components of the reflected optical beam from the magneto-optical disk 36 can be provided corresponding optical detectors of the composite optical detectors 44, 45. In this way, the composite optical detectors 44, 45 and the semiconductor laser 31 are installed on the base 61, and the hologram element 32 is installed in the housing 69, and, thus, the relative relationship between the positions of these circuits may be easily set. Therefore, it is easy to install and adjust these circuits. Namely, in the above configuration, the composite optical detectors 66, 67, the semiconductor laser 31, the hologram element 32, and the semiconductor integrated circuit 68 are integrated in the housing 69, and the housing 69 may be utilized as an optical device in which the relative relationship of these circuits' positions have already been adjusted. Such a housing 69 is suitable for the magneto-optical disk unit, etc.

Shapes of the base 61 and the housing 69 are not limited to those shown in FIG. 29, and, for example, a circular-type base 61 and a cylindrical-type housing 69 positioned on this base 61 may be used.

In the above-mentioned embodiments, it is easily understood that the focus error signal FES may be generated based on the −1-order diffraction light, and the tracking error signal TES may be generated based on the +1-order diffraction light.

Further, in the above-mentioned embodiments, the tracking error signal is generated based on the +1-order diffraction lights or −1-order diffraction lights detected in the far-field state before convergence and in the far-field state after convergence. However, the tracking error signal may be generated based on the +1-order diffraction lights or −1-order diffraction lights detected in only one state of the far-field state before convergence and the far-field state after convergence. In this case, by electrically correcting the output signals of one set of the two sets of the divide-by-2 optical detectors, the beam shift is prevented from having an effect on the tracking error signal.

To obtain the focus error signal FES, some methods such as a Fourcault method and an astigmatism method are currently proposed. The Fourcault method is most preferred to obtain a high reliability, since this method enables the focus servo to be performed with high accuracy. On the other hand, to obtain the tracking error signal TES, some methods such as a push-pull method and a heterodyne method are known. The push-pull method is mainly applied to an optical disk with grooves such as a magneto-optical disk, and the heterodyne method is mainly applied to an optical disk without the grooves such as a compact disk (CD).

As mentioned above, in the prior art methods, for obtaining the tracking error signal TES, it is necessary to use different methods according to the kind of optical disk. Therefore, it was impossible for one optical information recording-and-reproducing unit to record-and-reproduce the information for a plurality of types of optical disks. For example, in the case of the second conventional optical system shown in FIG. 2, when considering a relationship between boundary lines of the areas 13-1 to 13-4 of the hologram element 13, a tangent line of the track of the optical disk and a radial direction line of the optical disk, the tracking error signal TES can be obtained by only the push-pull method, and the tracking error signal TES cannot be obtained by the heterodyne method.

Figure 2:
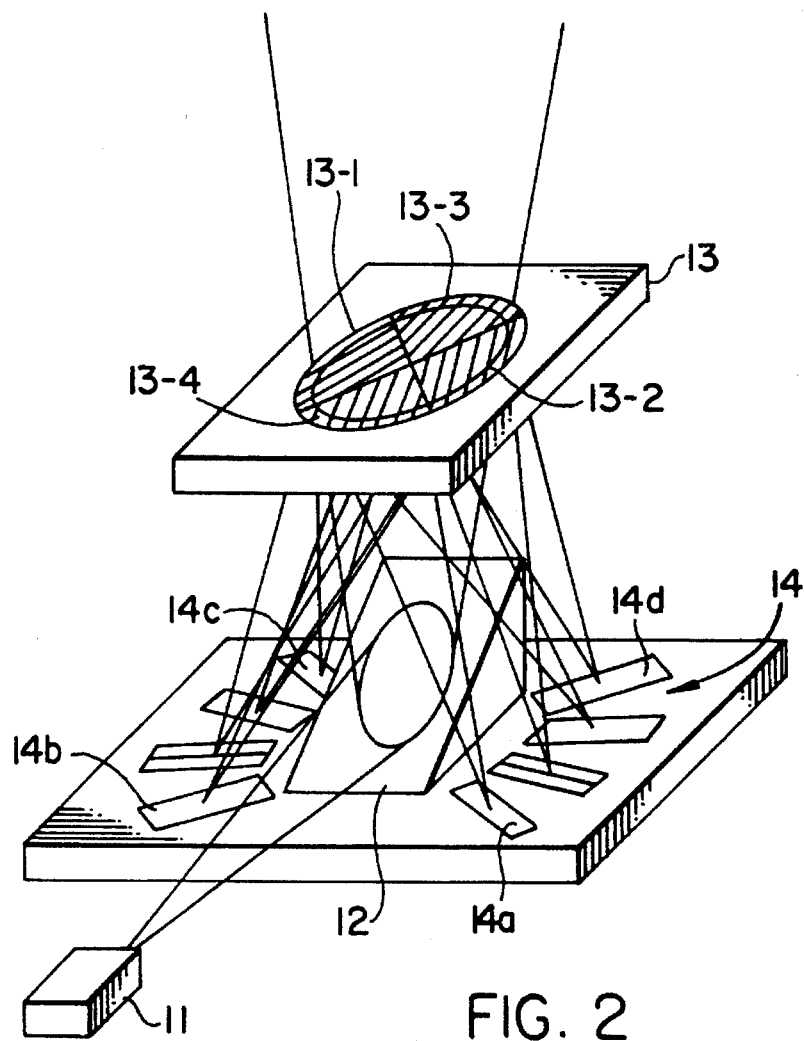
FIG. 2 shows a configuration of a second conventional optical system.
Figure 4A:
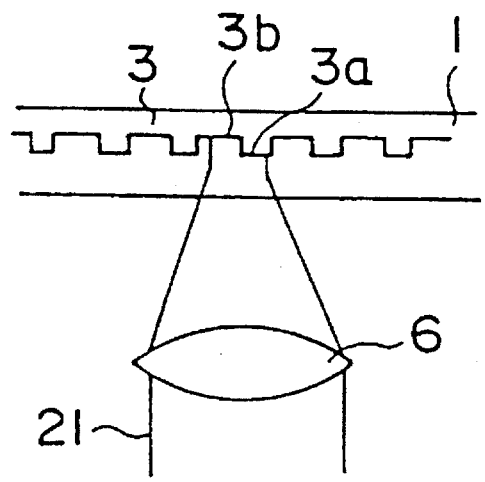
FIG. 4A to FIG. 4C show illustrations for explaining a generating process of the tracking error signal in the second conventional optical system when the beam spot is shifted from the track to a right side.
Figure 4B:
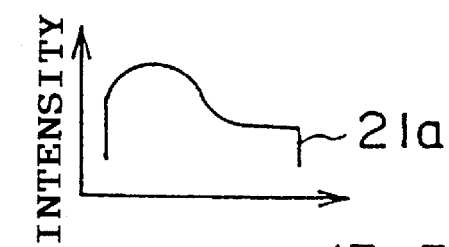
Figure 4C:
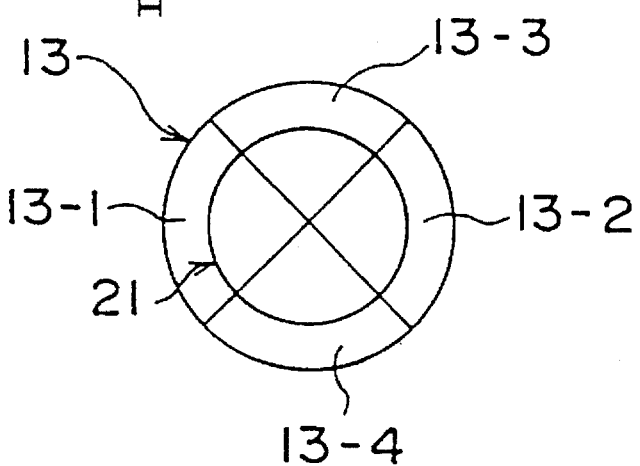

Further, in the second conventional optical system shown in FIG. 2, the optical beam is divided into approximately 8 beams by the hologram element 13. Therefore, the amount of light arriving at the optical detection system for detecting the beam to obtain the focus error signal FES is reduced approximately one to four ($=\frac{1}{8} \times 2$) of that of an original optical beam. When using the tracking focus error signal FES thus obtained, the signal level becomes small and the optical detection system may be easily influenced by outside sources, and, thus, the focus servo operation may not be accurately performed. In this case, to increase the reduced signal level, it is assumed that electrically amplifying the low-leveled focus error signal FES is effective. However, noise is easily added during amplification, and, thus, it is difficult to perform the a highly accurate focus servo.

In the following, embodiments capable of resolving the above problem as well as the previously mentioned problems will be described by referring to FIG. 30 to FIG. 37.

Figure 30:
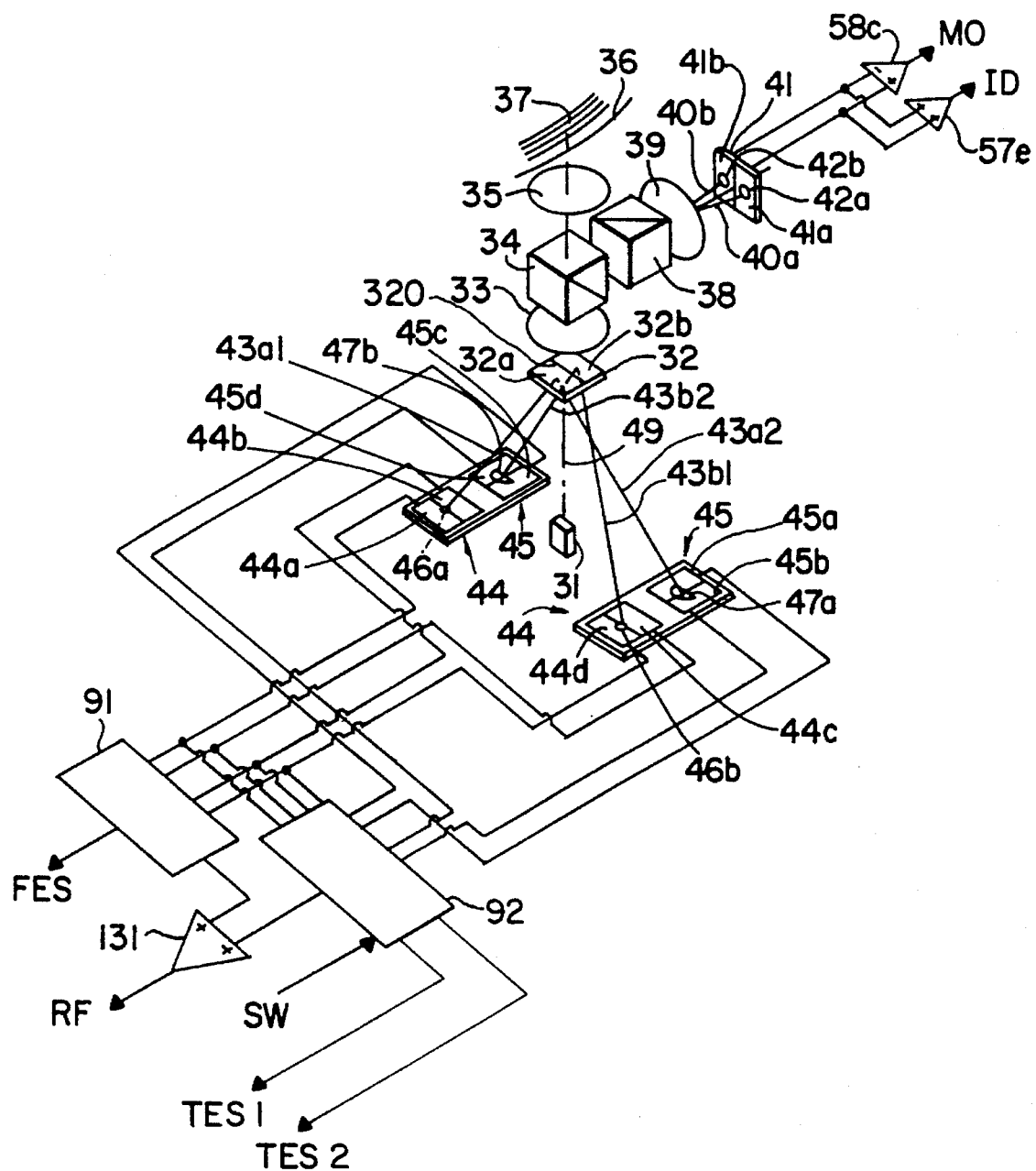
FIG. 30 shows a perspective view of a seventh embodiment of the optical information recording-and-reproducing unit according to the present invention.

FIG. 30 shows a perspective view of a seventh embodiment of the optical information recording-and-reproducing unit according to the present invention. Elements in FIG. 30 which are the same as those of FIG. 9 are given the same reference numerals.

In the seventh embodiment shown in FIG. 30, a focus-error-signal generation circuit 91, a tracking-error-signal generation circuit 92, and an operational amplifier 131 are installed. The focus-error-signal generation circuit 91 generates the focus error signal FES by using the Fourcault method based on the output signals of the divide-by-2 optical detectors 44a, 44b, 44c, 44d of the composite optical detector 44. The tracking-error-signal generation circuit 92 generates a tracking error signal TES1 by using the push-pull method and a tracking error signal TES2 by using the heterodyne method based on the output signals of the divide-by-2 optical detectors 44a, 44b, 44c, 44d of the composite optical detector 44 and the output signals of the divide-by-2 optical detectors 45a, 45b, 45c, 45d of the composite optical detector 45. The operational amplifier 131 generates a reproduced signal RF based on the signals from the focus-error-signal generation circuit 91 and the tracking-error-signal generation circuit 92.

Figure 31:
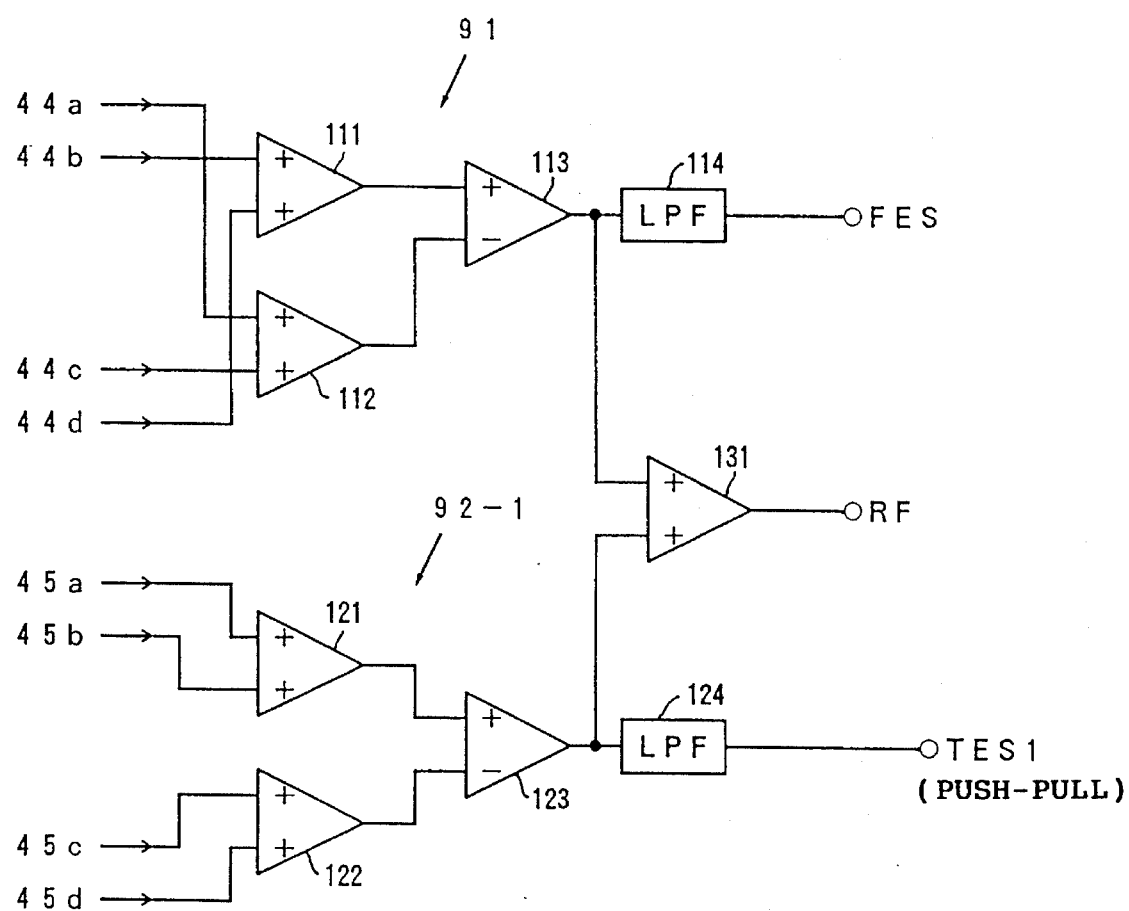
FIG. 31 shows a schematic diagram of a circuit generating a tracking error signal TES1 by using a push-pull method in a tracking-error-signal generation circuit and a schematic diagram of a focus-error-signal generation circuit.

FIG. 31 shows a schematic diagram of a circuit 92-1 generating the tracking error signal TES1 by using the push-pull method in the tracking-error-signal generation circuit 92 and a schematic diagram of the focus-error-signal generation circuit 91. In FIG. 31, for the convenience of the description, numerals 44a to 44d and 45a to 45d, respectively, represent the output signals of the divide-by-2 optical detectors 44a to 44d and 45a to 45d. The focus-error-signal generation circuit 91 comprises operational amplifiers 111 to 113 and a low pass filter (LPF) 114 as shown in FIG. 31. On the other hand, the circuit 92-1 comprises operational amplifiers 121 to 123 and an LPF 124. The operational amplifiers 113, 123 substantially perform subtracting operations. The tracking error signal TES1 which is obtained by using the push-pull method is produced from the LPF 124.

Figure 32:
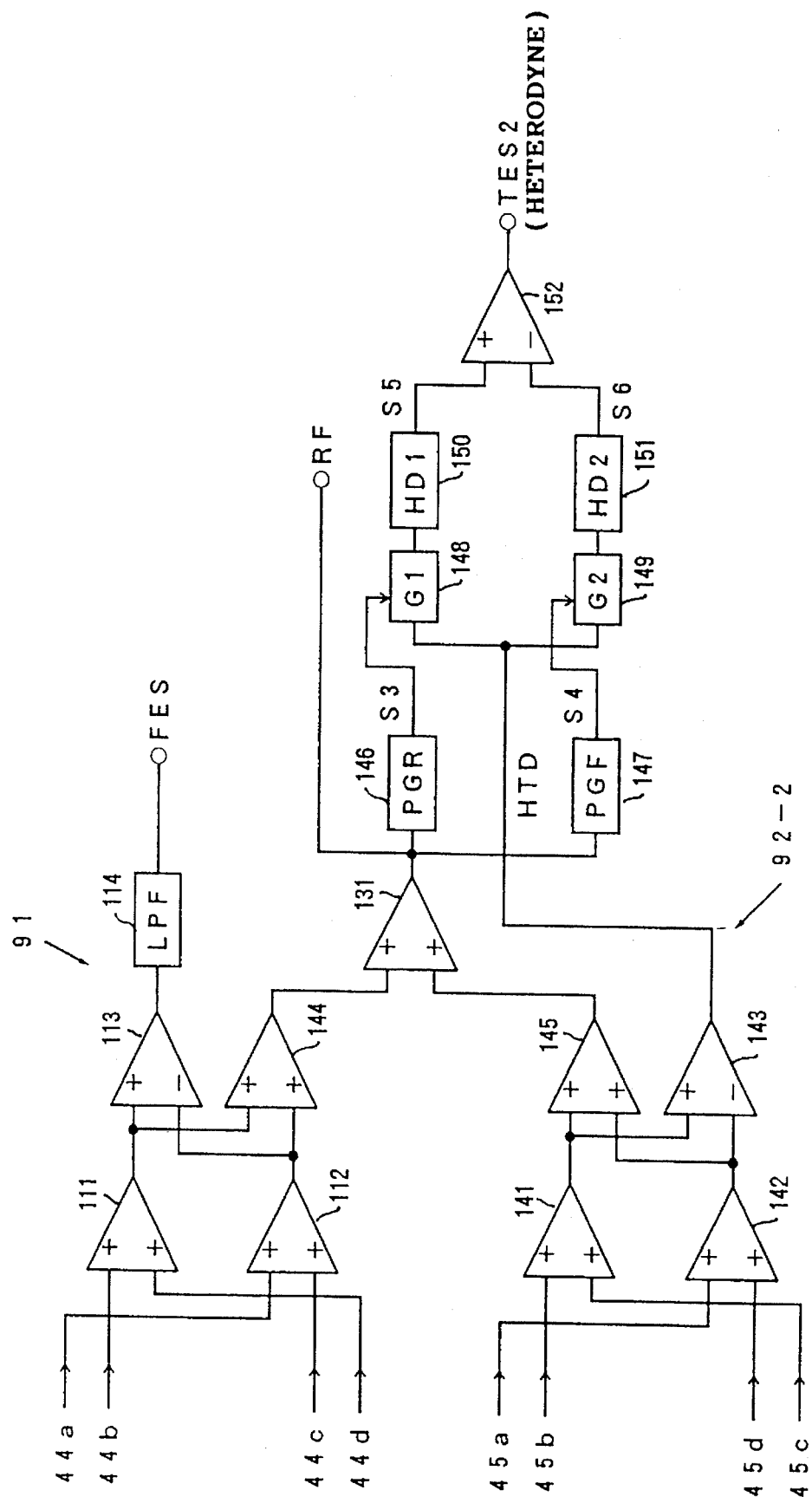
FIG. 32 shows a schematic diagram of a circuit 92-2 generating a tracking error signal TES2 by using a heterodyne method in the tracking-error-signal generation circuit and the schematic diagram of the focus-error-signal generation circuit.

FIG. 32 shows a schematic diagram of a circuit 92-2 generating the tracking error signal TES2 by using the heterodyne method in the tracking-error-signal generation circuit 92 and the schematic diagram of the focus-error-signal generation circuit 91. In FIG. 32, for the convenience of the description, the numerals 44a to 44d and 45a to 45d, respectively, represent the output signals of the divide-by-2 optical detectors 44a to 44d and 45a to 45d. The focus-error-signal generation circuit 91 has the same configuration as that shown in FIG. 31. On the other hand, the circuit 92-2 comprises operational amplifiers 141 to 145, a pulse generator (PGR) 146 generating a pulse at a zero-crossing time when the reproduced signal RF rises up, a pulse generator (PGF) 147 generating a pulse at another zero-crossing time when the reproduced signal RF falls down, gate circuits (G1, G2) 148, 149, sample-hold circuits (HD1, HD2) 150, 151, and an operational amplifier 152. The operational amplifiers 113, 143, 152 substantially perform the subtracting operations. The tracking error signal TES2 which is obtained by using the heterodyne method is produced from the operational amplifier 152.

Figure 33:
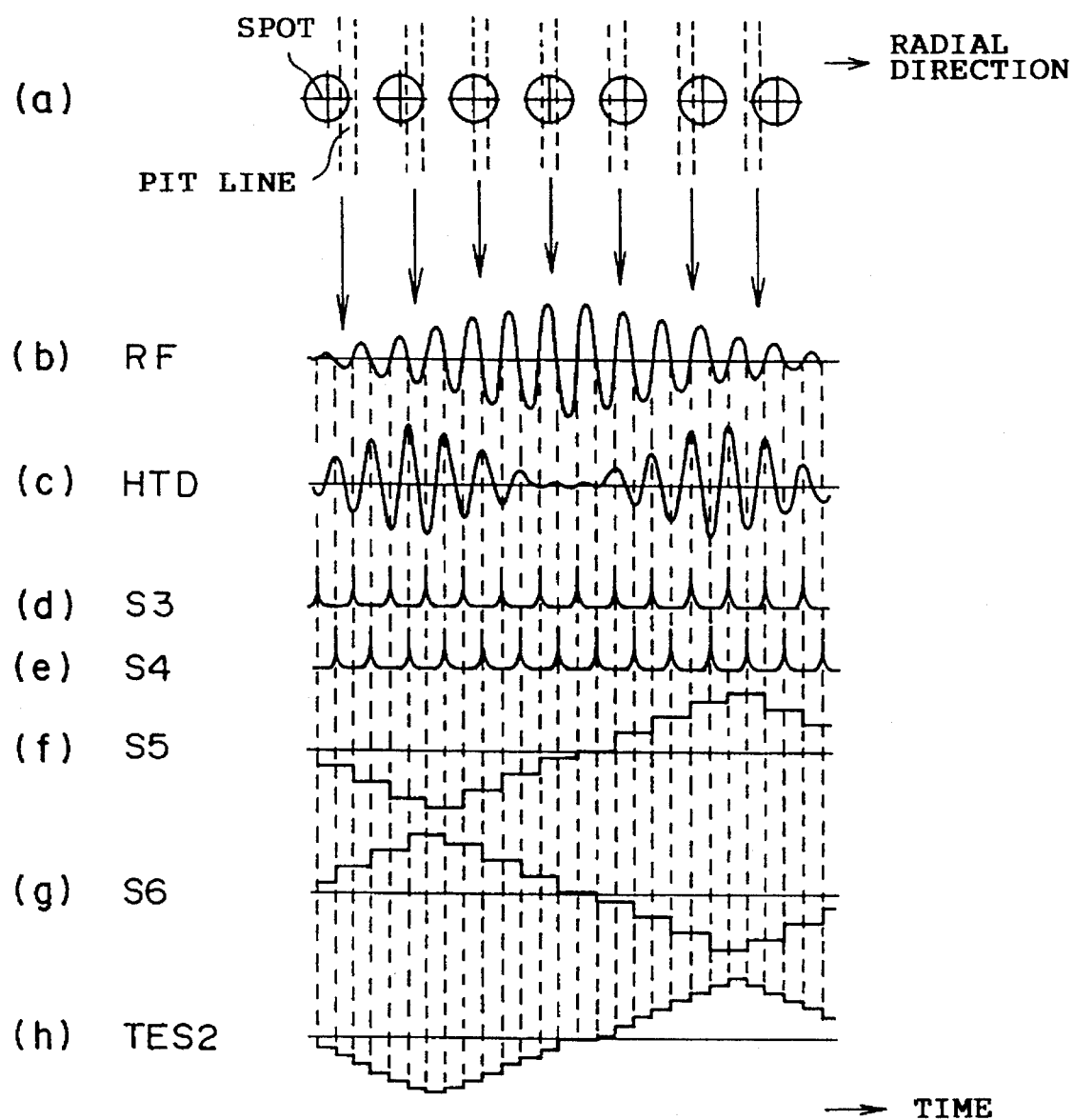
FIG. 33 shows an illustration for explaining an operation principle of the circuit 92-2 shown in FIG. 32.

FIG. 33 shows an illustration for explaining the operation principle of the circuit 92-2 shown in FIG. 32. The illustration is disclosed in Japanese publication, "OPTICAL MEMORY, OPTICAL MAGNETIC MEMORY, SYNTHESIZED TECHNIQUE COMPILATION" editorial supervisors, Yoshifumi Sakurai and Shizuo Tatsuoka, Science Forum L.T.D. Oct. 3, 1983. In FIG. 33, (a) shows optical beam spots which are formed at different positions on pits arranged on the optical disk, and (b) to (h) show signal waveforms at each part of the circuit 92-2 for the respective optical beam spots of (a). In FIG. 33, the signal waveform (b) shows the reproduced signal RF produced from the operational amplifier 131, the signal waveform (c) shows a signal HTD produced from the operational amplifier 143, the signal waveform (d) shows a signal S3 produced from the pulse generator 146, the signal waveform (e) shows a signal D4 produced from the pulse generator 147, the signal waveform (f) shows a signal S5 produced from the sample-hold circuit 150, the signal waveform (g) shows a signal S6 produced from the sample-hold circuit 151, and the signal waveform (h) shows the tracking error signal TES2 produced from the operational amplifier 152.

In this way, in the seventh embodiment, from the tracking-error-signal generation circuit 92, the tracking error signal TES1 is obtained by the push-pull method and the tracking error signal TES2 is obtained by the heterodyne method. Therefore, according to the kind of optical disk, namely, the method of obtaining the tracking error signal TES which is used to the optical disk, a user can select the tracking error signal TES1 or the tracking error signal TES2, and can supply a selected one to a tracking servo system (not shown).

In the seventh embodiment, the optical beam is divided into approximately 4 beams in the hologram element 32. Therefore, the amount of light arriving at the optical detection system for detecting the beam to obtain the focus error signal FES is reduced approximately half ($=\frac{1}{4} \times 2$) that of the original optical beam. The amount of light is twice that of the second conventional optical system. Accordingly, when using the tracking focus error signal FES thus obtained, the signal level is relatively high and the optical detection system may not be easily influenced by outside sources, and, thus, a highly accurate focus servo operation may be performed. In this case, since the signal level of the focus error signal FES is relatively high, it is not necessary to electrically amplify the focus error signal FES by an extreme amount. Therefore, noise is hardly added during amplification, and, thus, it prevents the accuracy of the focus servo from being degraded by the noise.

Figure 34:
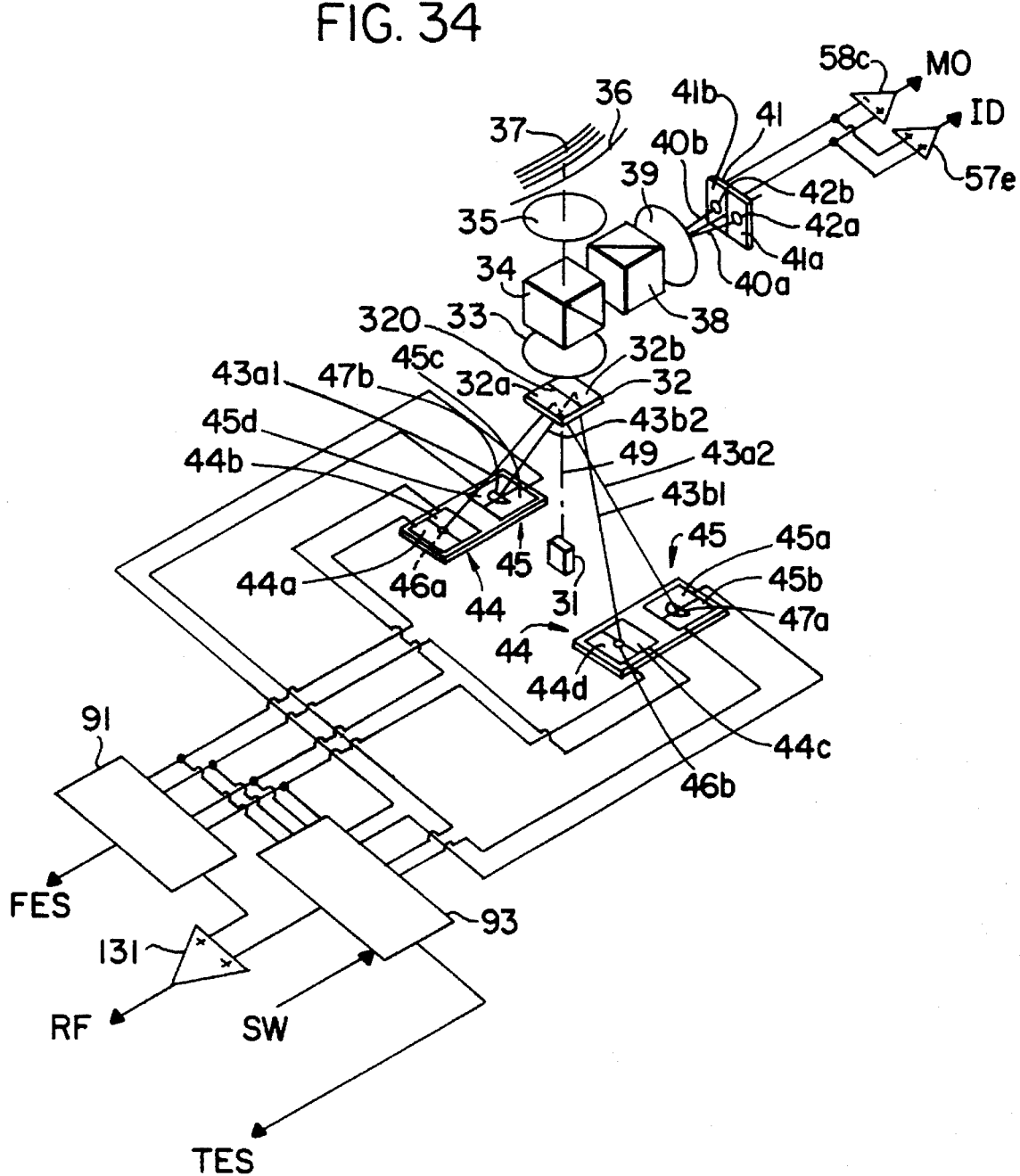
FIG. 34 shows a perspective view of an eighth embodiment of the optical information recording-and-reproducing unit according to the present invention.

FIG. 34 shows a perspective view of an eighth embodiment of the optical information recording-and-reproducing unit according to the present invention. Elements in FIG. 34 which are the same as those of FIG. 30 are given the same reference numerals.

In the eighth embodiment shown in FIG. 34, the focus-error-signal generation circuit 91, a tracking-error-signal generation circuit 93, and the operational amplifier 131 are installed. The focus-error-signal generation circuit 91 generates the focus error signal FES by using the Foucault method based on the output signals of the divide-by-2 optical detectors 44a, 44b, 44c, 44d of the composite optical detector 44. The tracking-error-signal generation circuit 93 generates the tracking error signal TES1 by using the push-pull method and the tracking error signal TES2 by using the heterodyne method based on the output signals of the divide-by-2 optical detectors 44a, 44b, 44c, 44d of the composite optical detector 44 and the output signals of the divide-by-2 optical detectors 45a, 45b, 45c, 45d of the composite optical detector 45, and produces one of the tracking error signals TES1, TES2 in response to a switching signal SW. The operational amplifier 131 generates the reproduced signal RF based on the signals from the focus-error-signal generation circuit 91 and the tracking-error-signal generation circuit 93.

Figure 35:
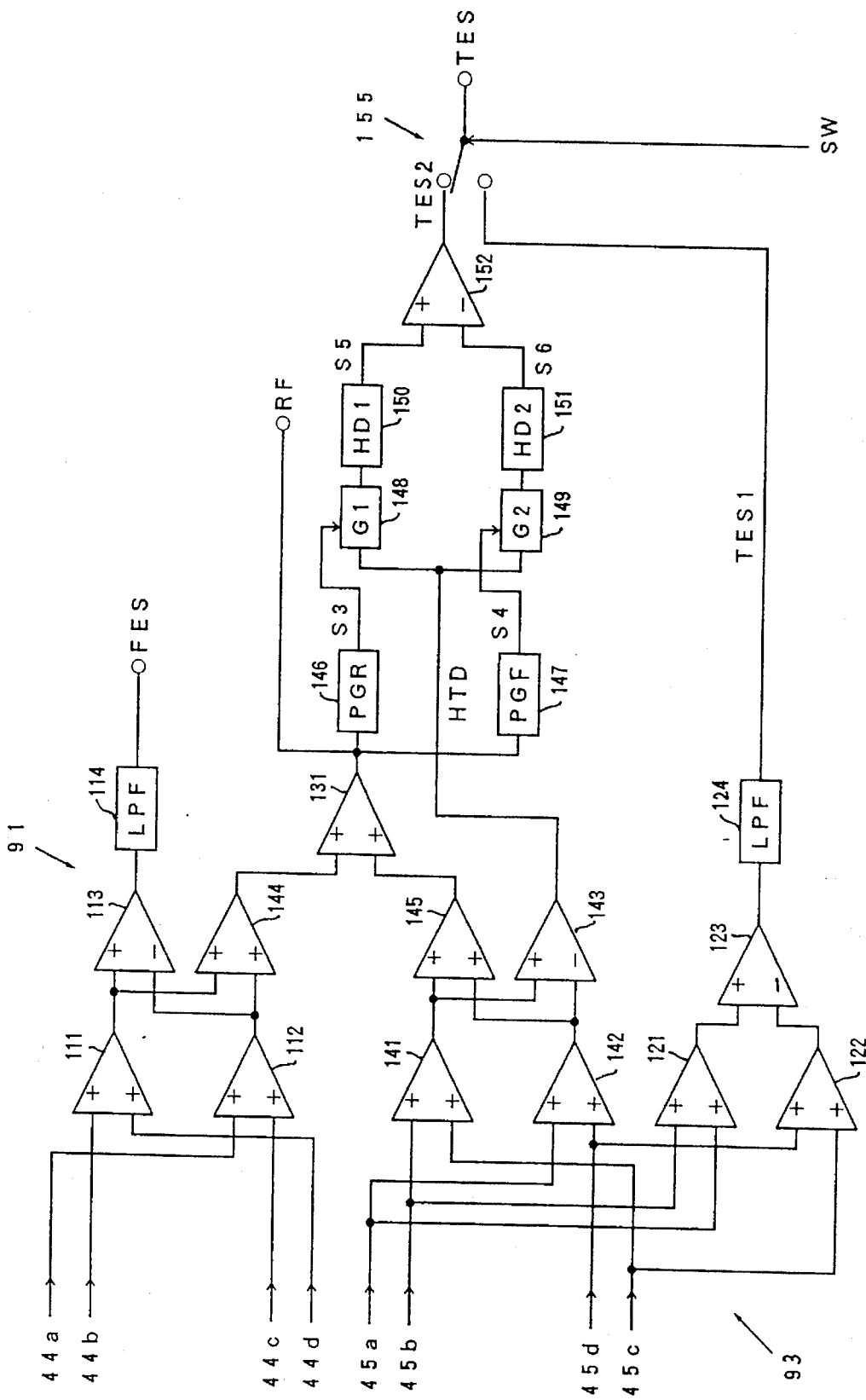
FIG. 35 shows a schematic diagram of a tracking-error-signal generation circuit 93 and a focus-error-signal generation circuit 91 shown in FIG. 34.

FIG. 35 shows a schematic diagram of a tracking-error-signal generation circuit 93 and a focus-error-signal generation circuit 91 shown in FIG. 34. Elements in FIG. 35 which are the same as those of FIG. 31 and FIG. 32 are given the same reference numerals. In FIG. 35, for the convenience of the description, numerals 44a to 44d and 45a to 45d, respectively, represent the output signals of the divide-by-2 optical detectors 44a to 44d and 45a to 45d.

In FIG. 35, the focus-error-signal generation circuit 91 comprises the operational amplifiers 111 to 113 and the LPF 114. On the other hand, the tracking-error-signal generation circuit 93 comprises a first circuit section generating the tracking error signal TES1, a second circuit section generating the tracking error signal TES2, and a switching circuit 155. The first circuit section comprises the operational amplifiers 121 to 123 and the LPF 124. The second circuit section comprises the operational amplifiers 141 to 145, the pulse generator (PGR) 146 generating the pulse at the zero-crossing time when the reproduced signal RF rises up, the pulse generator (PGF) 147 generating the pulse at another zero-crossing time when the reproduced signal RF falls down, the gate circuits (G1, G2) 148, 149, the sample-hold circuits (HD1, HD2) 150, 151, and the operational amplifier 152. The switching circuit 155 is supplied with the tracking error signals TES1, TES2 from the first and second circuit sections. The switching circuit 155 selects one of the tracking error signals TES1, TES2 in response to the switching signal SW, and produces the selected one as the tracking error signal TES of the tracking-error-signal generation circuit 93.

As mentioned above, in the eighth embodiment, one of the tracking error signal TES1 obtained by the push-pull method and the tracking error signal TES2 obtained by the heterodyne method is selected in response to the switching signal SW, and is produced from the tracking-error-signal generation circuit 93. Therefore, according to the kind of optical disk, namely, the method of obtaining the tracking error signal TES, the user can select the tracking error signal TES1 or the tracking error signal TES2 by using the switching signal SW, and can supply the selected one to the tracking servo system (not shown). The switching signal SW may be manually operated by the user by a selection on the operational panel of the optical information recording-and-reproducing unit. The switching signal SW may be automatically generated based on the kind of optical disk loaded in the optical information recording-and-reproducing unit.

In this embodiment, in the same way as the seventh embodiment, the focus error signal FES is not easily influenced by outside sources, and a highly accurate focus servo operation may be performed.

Figure 36:
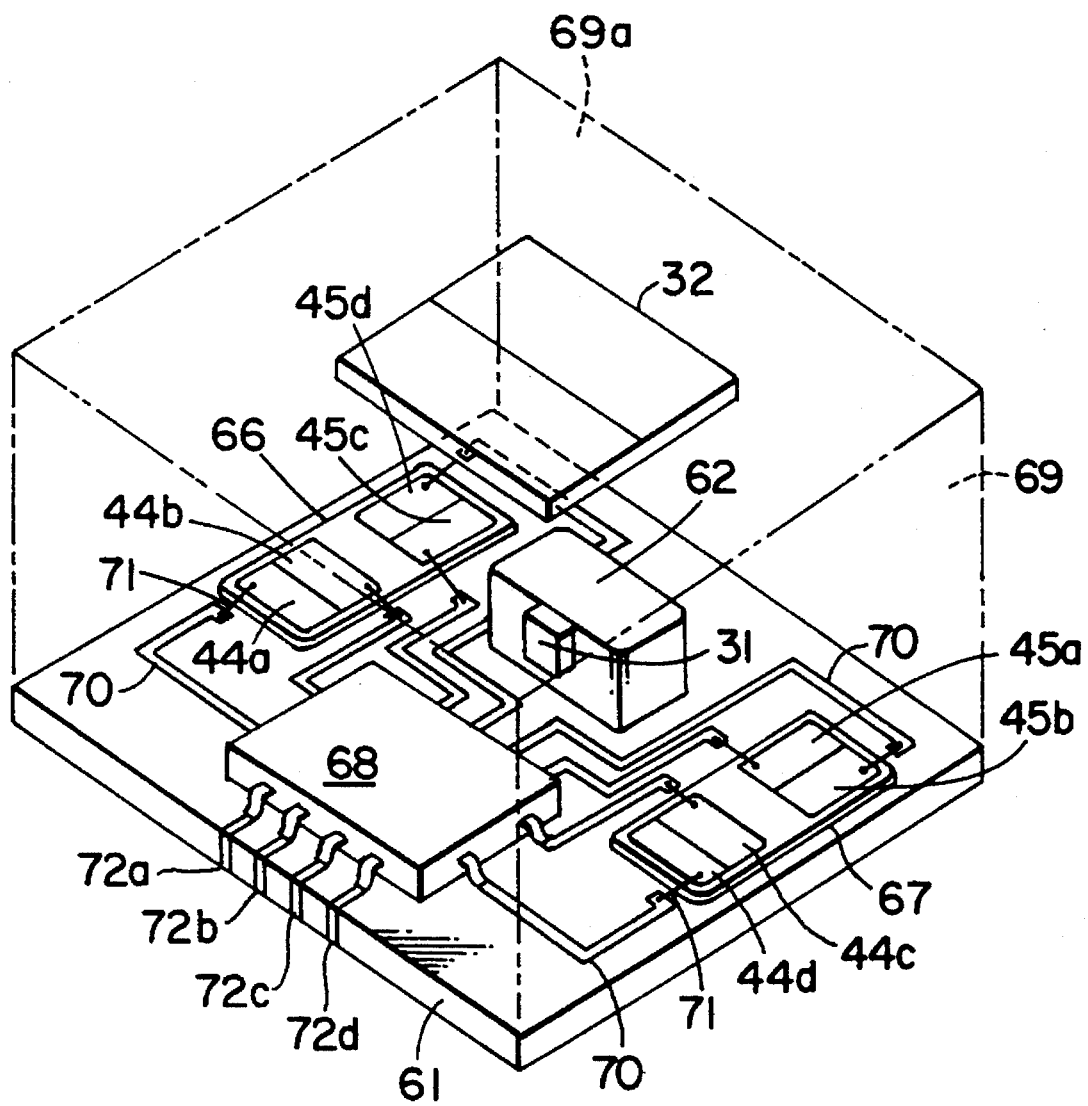
FIG. 36 shows a perspective view of a ninth embodiment of the optical information recording-and-reproducing unit according to the present invention.

FIG. 36 shows a perspective view of a ninth embodiment of the optical information recording-and-reproducing unit according to the present invention. Elements in FIG. 36 which are the same as those of FIG. 29 are given the same reference numerals.

In FIG. 36, the base 61 is made of, for example, ceramic such as alumina and nitride aluminum, and the supporting element 62 is made of, for example, metal such as copper and iron, or ceramic. In the semiconductor integrated circuit 68, the focus-error-signal generation circuit 91, the tracking-error-signal generation circuit 93, and the operational amplifier, etc., shown in FIG. 34 are included. On the base 61, for example, a connection pattern 70 for electrically connecting the semiconductor integrated circuit 68 and the composite optical detectors 66, 67, etc., is printed and formed. The connection pattern 70 and the composite optical detectors 66, 67 are connected to each other by wire bonding with wires 71. Ports of the semiconductor integrated circuit 68 are connected to electrodes 72a to 72d formed on the base 61. For example, the focus error signal FES is produced from the electrode 72a, the tracking error signal TES is produced from the electrode 72b, the reproduced signal RF is produced from the electrode 72c, and the switching signal SW is supplied to the electrode 72d. In FIG. 36, for the convenience of the description, the main ports and electrodes are illustrated, and other required lines such as a power supply line for the semiconductor laser 31 are not shown.

In this embodiment, the composite optical detectors 66, 67, the semiconductor integrated circuit 68, the connection pattern 70, and the electrodes 72a to 72d may be individually installed on the base 61. At least one of these may be directly formed on the common base 61.

When the focus-error-signal generation circuit 91, the tracking-error-signal generation circuit 92, the operational amplifier 131, etc., shown in FIG. 30 are included in the semiconductor integrated circuit 68, it is easily understood that electrodes for producing the tracking error signals TES1, TES2 are provided in addition to the electrodes for producing the focus error signal FES and the reproduced signal RF.

According to this embodiment, the optical components and the circuit components are integrated in the housing 69 and the housing 69 may be utilized as the optical device in which the relative relationship of these circuits' positions have already been adjusted. Such a housing 69 is suitable for the optical disk unit, etc.

Figure 37:
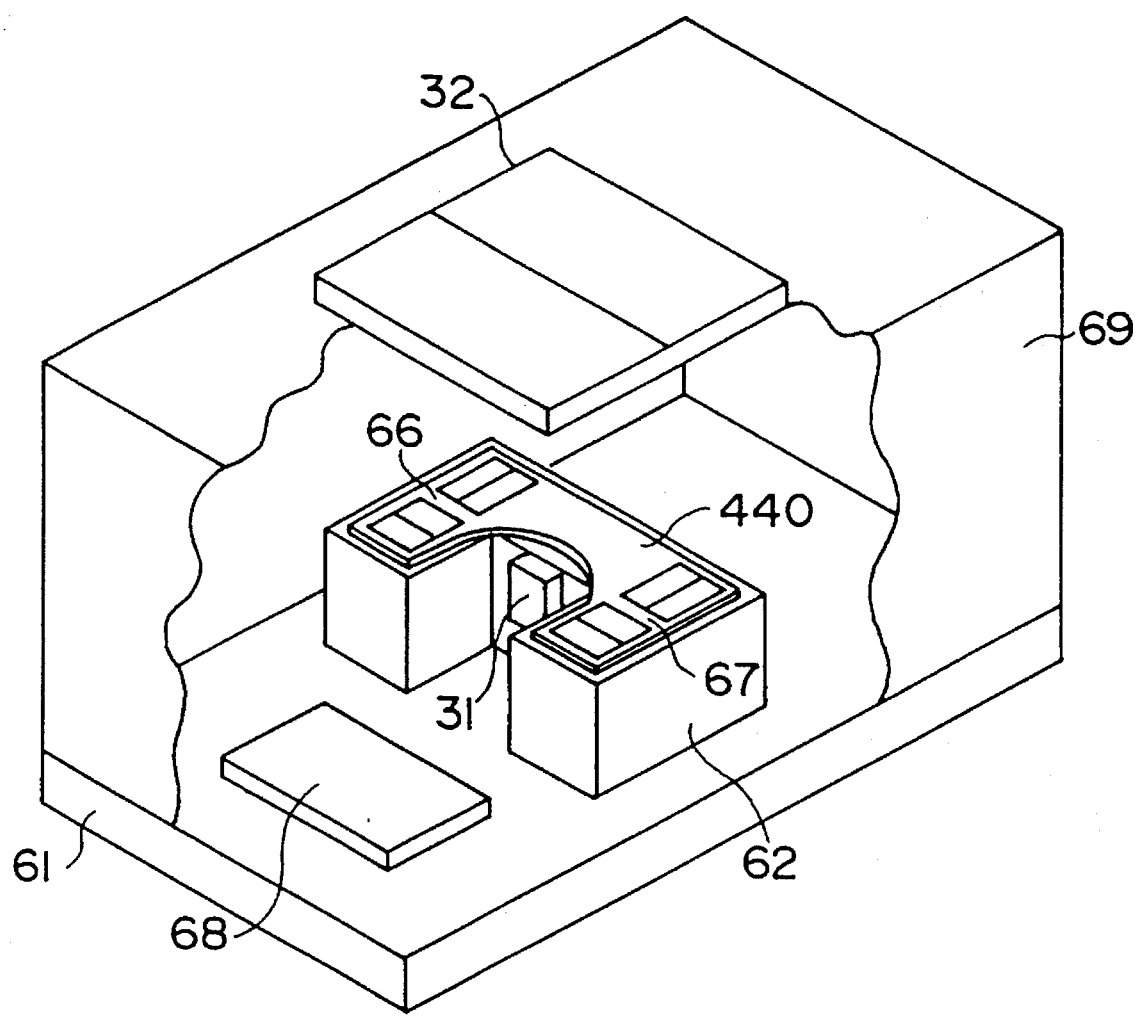
FIG. 37 shows a perspective view of a tenth embodiment of the optical information recording-and-reproducing unit according to the present invention.

FIG. 37 shows a perspective view of a tenth embodiment of the optical information recording-and-reproducing unit according to the present invention. Elements in FIG. 37 which are the same as those of FIG. 29 are given the same reference numerals.

In FIG. 37, the supporting element 62 has a concave-like shape, and a base 440 made of, for example, silicon is provided on the supporting element 62. On the base 440, the composite optical detectors 66, 67 are directly formed. In this way, though the composite optical detectors 66, 67 are not installed on the base 61 but on the base 440, these detectors may have relatively simple configurations. In FIG. 37, for the convenience of the description, the connection pattern and electrodes are not shown.

Also, this embodiment may have the same effects as the ninth embodiment has.

As described above, the present inventions have the following features.

According to the above optical information recording-and-reproducing unit, even if a beam shift is caused by position change of optical components, fluctuation of a plane of a storage medium during rotation of a magneto-optical disk, etc., the regular tracking error signal having no offset may be generated. Therefore, the tracking servo may be always carried out with high accuracy.

According to the above unit, one of a pair of +1-order diffraction lights and a pair of −1-order diffraction lights produced from the diffraction section is used for generating the tracking error signal, and the other pair is used for generating the focus error signal. Therefore, usability of the optical beam may be improved. Since both the +1-order diffraction light and the −1-order diffraction light are used, it is not necessary to use a specific hologram for the diffraction section. Thus, the unit cost may be reduced.

According to the above unit, the housing is installed on the base, and the housing houses the first through fourth optical detection sections, the first and second circuit sections, and the light source. The housing may be utilized as the optical device in which the relative relationship between the positions of the above sections has already been adjusted. The unit is suitable, for example, as a magneto-optical disk unit.

According to the above unit, since the Fourcault method is used for a method of detecting the focus error, a stable focus servo may be carried out. Therefore, the possibility of an occurrence of a reproduction error is be reduced.

According to the above unit, based on the outputs of the first signal generation circuit and the second signal generation circuit, the tracking error signal is obtained by using the push-pull method or the heterodyne method. Therefore, for both the magneto-optical disk using the push-pull method and the compact disk using the heterodyne method, recording and reproducing operations may be performed by the single unit.

According to the above unit, which of the output signals of the first signal generation circuit and the second signal generation circuit is produced as the tracking error signal may be automatically determined by the switching signal.

According to the present invention, since an amount of light of the reflected signal which is reflected on the storage medium and is provided to the optical detection system is efficiently used, it prevents the quality of the detected signal from being degraded. Further, even if a beam shift occurs, the regular tracking servo may be maintained, and the occurrence possibility of the reproduction error may be reduced.

Further, the present invention is not limited to these embodiments, other variations and modifications may be made without departing from the scope of the present invention.

What is claimed is:

1. An optical head unit for an optical disk using a diffraction grating comprising:
   diffraction means provided with a reflected optical beam reflected on a storage medium, said diffraction means having a plurality of areas which respectively produce +1-order diffraction light and −1-order diffraction light;
   first and second optical detection means for respectively detecting one polarity diffraction light of said +1-order diffraction light and said −1-order diffraction light produced from said areas of said diffraction means in a far-field state;
   first circuit means for generating a tracking error signal based on output signals of said first and second optical detection means;
   third and fourth optical detection means for respectively detecting the other polarity diffraction light of said +1-order diffraction light and said −1-order diffraction light produced from said areas of said diffraction means, said third and fourth optical detection means being positioned adjacent to a focussed point of said other polarity diffraction light; and
   second circuit means for generating a focus error signal based on output signals of said third and fourth optical detection means.

2. The unit as claimed in claim 1, wherein said first circuit means comprises:
   a first signal generation circuit generating a first tracking error signal by a push-pull system based on said output signals of said first and second optical detection means; and
   a second signal generation circuit generating a second tracking error signal by using a heterodyne system based on said output signals of said first, second, third and fourth optical detection means.

3. The unit as claimed in claim 2, wherein said first circuit means further comprises a switching circuit which selects one of said output signals of said first signal generation circuit and said second signal generation circuit according to a switching signal and produces a selected output signal as said tracking error signal produced from said first circuit means.

4. The unit as claimed in claim 2, wherein said second circuit means comprises means for generating said focus error signal by using a Fourcault method.

5. The unit as claimed in claim 4, wherein said first circuit means further comprises a switching circuit which selects one of said output signals of said first signal generation circuit and said second signal generation circuit according to a switching signal and produces a selected output signal as said tracking error signal produced from said first circuit means.

6. The unit as claimed in claim 4, wherein said unit further comprises a single base on which said first, second, third and fourth optical detection means, and said first and second circuit means are provided.

7. The unit as claimed in claim 6, wherein said first, second, third and fourth optical detection means, and said first and second circuit means are formed on said base.

8. The unit as claimed in claim 6, wherein said unit further comprises a housing, provided on said base, for housing said first, second, third and fourth optical detection means, and said first and second circuit means, said diffraction means being fixed to said housing.

9. The unit as claimed in claim 8, wherein said unit further comprises a light source, on said base in said housing, said light source providing an optical beam focused on said storage medium.

10. The unit as claimed in claim 2, further comprising a single base in which said first, second, third and fourth optical detection means are installed.

11. The unit as claimed in claim 10, further comprising a light source providing an optical beam which is focused on said storage medium;

wherein said first optical detection means and said third optical detection means are symmetrically arranged on said base about an optical axis of an optical path of the optical beam from said light source to said storage medium, and said second optical detection means and said fourth optical detection means are symmetrically arranged on said base about said optical axis.

12. The unit as claimed in claim 10, wherein said first, second, third and fourth optical detection means are directly formed on said base.

13. The unit as claimed in claim 11, wherein said light source is installed on said base.

14. The unit as claimed in claim 13, further comprising a supporting element said light source on said base and radiating heat generated by said light source.

15. The unit as claimed in claim 11, further comprising a housing, installed on said base, for housing said first, second, third and fourth optical detection means, said first and second circuit means, and said light source, said diffraction means being fixed to said housing.

16. The unit as claimed in claim 15, further comprising a supporting element for supporting said light source in said housing and radiating heat generated by said light source.

17. The unit as claimed in claim 2, wherein said diffraction means comprises:

a hologram element having a plurality of areas including first and second areas, said plurality of areas formed by at least one dividing line approximately parallel to a direction in which intensity distribution of the reflected beam changes with track on the storage medium;

wherein when said reflected beam is provided to said hologram element, each of said areas produces a +1-order diffraction light and a −1-order diffraction light to two associated elements selected from the group consisting of said first, second, third and fourth optical detection means.

\* \* \* \* \*

UNITED STATES PATENT AND TRADEMARK OFFICE
CERTIFICATE OF CORRECTION

PATENT NO. : 5,619,482
DATED : April 8, 1997
INVENTOR(S) : Tezuka et al.

Figure 5A:
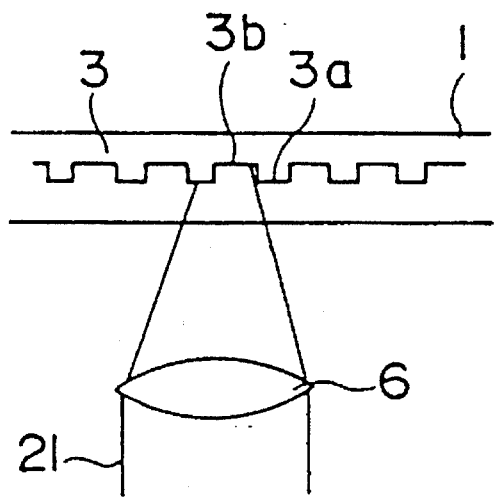
FIG. 5A to FIG. 5C show illustrations for explaining a generating process of the tracking error signal in the second conventional optical system when the beam spot is shifted from the track to a left side.
Figure 5B:
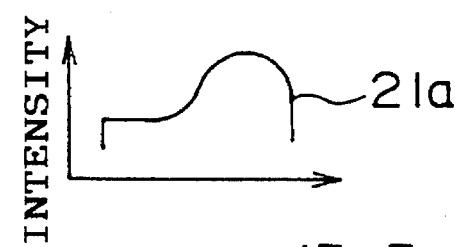
Figure 5C:
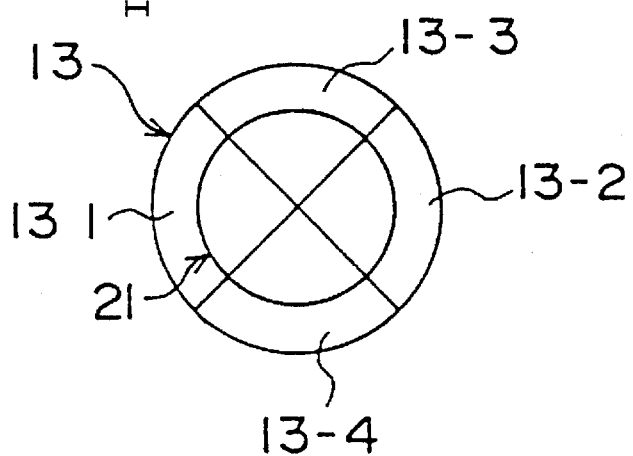
Figure 6A:
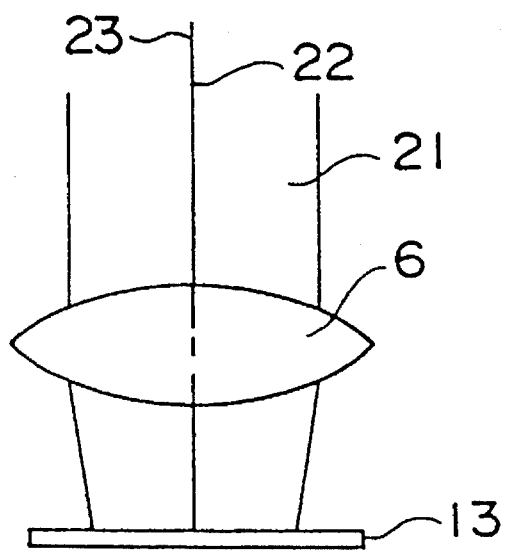
FIG. 6A and FIG. 6B show illustrations for explaining the generating process of the tracking error signal in the second conventional optical system when no beam shift occurs.
Figure 6B:
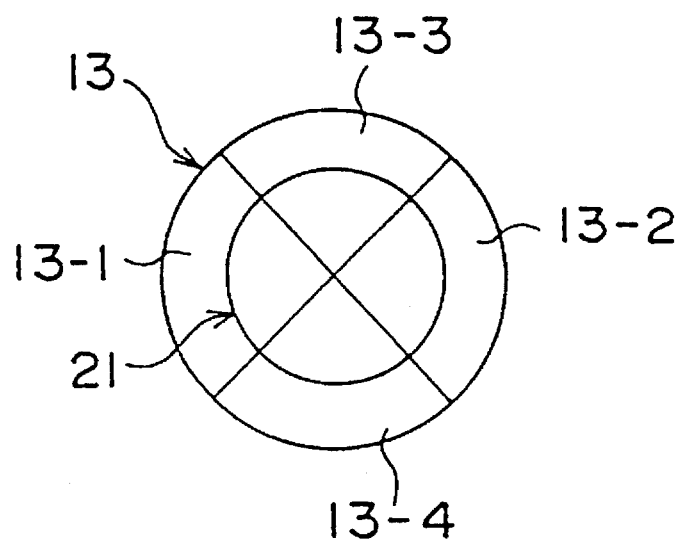
Figure 7A:
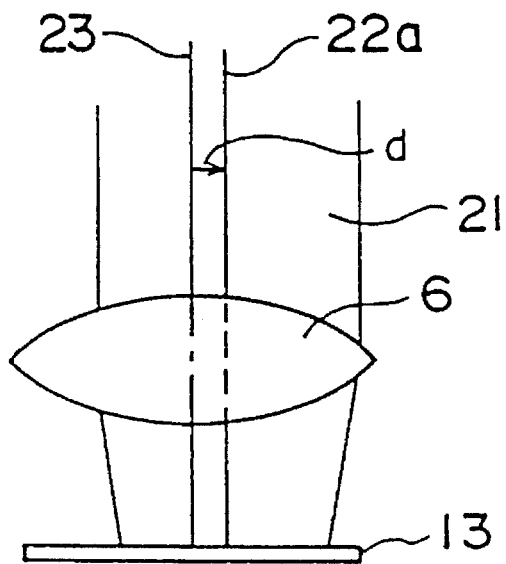
FIG. 7A and FIG. 7B show illustrations for explaining the generating process of the tracking error signal in the second conventional optical system when the beam is shifted from an optical axis to the right side by the beam shift.
Figure 7B:
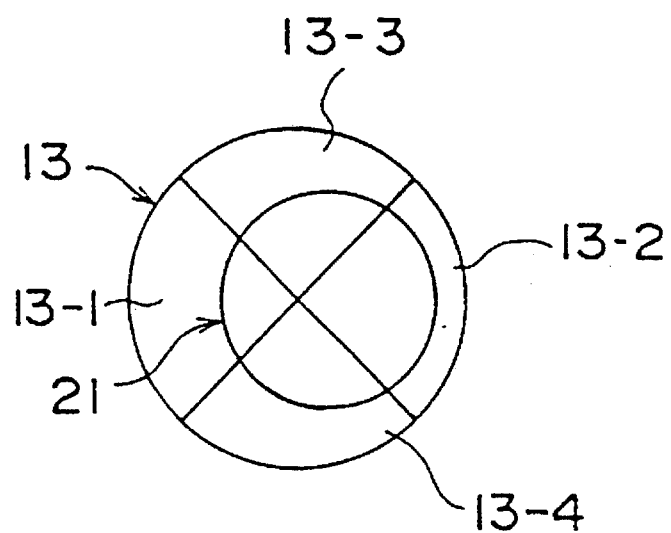
Figure 8A:
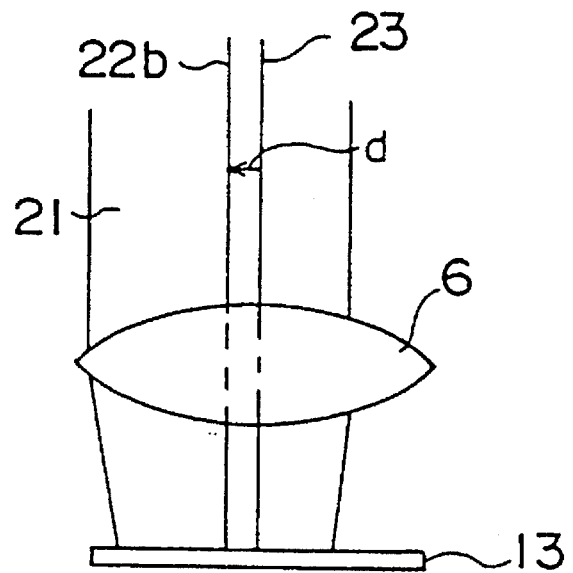
FIG. 8A and FIG. 8B show illustrations for explaining the generating process of the tracking error signal in the second conventional optical system when the beam is shifted from the optical axis to the left side by the beam shift.
Figure 8B:
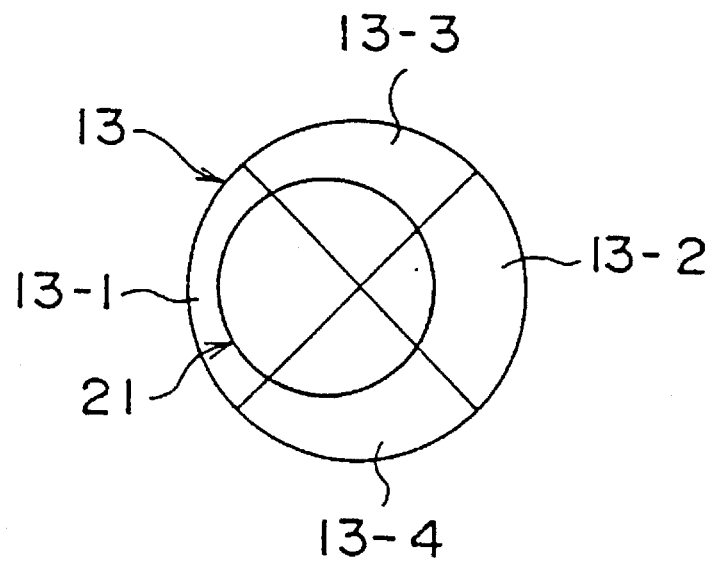

It is certified that error appears in the above-indentified patent and that said Letters Patent is hereby corrected as shown below:

Column 2, line 44, delete "FIGs. 5A.5B.5C" and insert --FIGs. 5A, 5B, 5C.-- therefor.

Column 2, line 67, delete "relationship the reflected" and insert --relationship of the reflected-- therefor.

Column 3, line 14, delete "other optical detector" and insert --other optical detectors-- therefor.

Column 3, line 15, delete "to 14d, these" and

UNITED STATES PATENT AND TRADEMARK OFFICE
CERTIFICATE OF CORRECTION

PATENT NO. : 5,619,482
DATED : April 8, 1997
INVENTOR(S) : Tezuka et al.

It is certified that error appears in the above-indentified patent and that said Letters Patent is hereby corrected as shown below:

insert --to 14d. These-- therefor.

Column 3, line 37, delete "hand, When" and insert --hand, when-- therefor.

Column 6, line 56, delete "corresponding to ones" and insert --corresponding ones-- therefor.

Column 9, line 58, delete "reproducing when" and insert --reproducing unit when-- therefor.

Column 11, line 28, delete "light does not"

and insert --light, do not-- therefor.

Column 13, line 15, delete "FIG. 12B shoes

UNITED STATES PATENT AND TRADEMARK OFFICE
CERTIFICATE OF CORRECTION

PATENT NO. : 5,619,482
DATED : April 8, 1997
INVENTOR(S) : Tezuka et al.

It is certified that error appears in the above-indentified patent and that said Letters Patent is hereby corrected as shown below:

a spot" and insert --FIG. 12B shows a spot-- therefor.

Column 13, line 20, delete "FIG. 13B shoes a spot" and insert --FIG. 13B shows a spot-- therefor.

Column 15, line 7, delete "19A.19B to" and insert --19A, 19B to-- therefor.

Column 15, line 20, delete "FIGs. 19A.19B to" and insert --FIGs. 19A, 19B to-- therefor.

Column 15, line 21, delete "FIGs. 16A.16B" and insert --FIGs. 16A, 16B-- therefor.

Column 15, line 65, delete "(45b + 45d) =

UNITED STATES PATENT AND TRADEMARK OFFICE
CERTIFICATE OF CORRECTION

PATENT NO. : 5,619,482
DATED : April 8, 1997
INVENTOR(S) : Tezuka et al.

It is certified that error appears in the above-indentified patent and that said Letters Patent is hereby corrected as shown below:

0," and insert --(45b + 45d) $\approx$ 0,-- therefor.

Column 19, line 1, delete "(44a, to 44d)" and insert --(44a to 44d)-- therefor.

Column 19, line 43, delete "will be describe later)." and insert --will be described later).-- therefor.

Column 19, line 56, delete "be describe later)." and insert --be described later).-- therefor.

Column 25, line 43, delete "error is be" and insert --error is-- therefor.

UNITED STATES PATENT AND TRADEMARK OFFICE
CERTIFICATE OF CORRECTION

PATENT NO. : 5,619,482
DATED : April 8, 1997
INVENTOR(S) : Tezuka et al.

It is certified that error appears in the above-indentified patent and that said Letters Patent is hereby corrected as shown below:

Column 26, line 21, delete "a focussed point" and insert --a focused point-- therefor.

Column 27, line 22, after "supporting element", insert --supporting--.

Signed and Sealed this

Twenty-fourth Day of March, 1998

Attest:

BRUCE LEHMAN

*Attesting Officer*  Commissioner of Patents and Trademarks